United States Patent
Wang

(10) Patent No.: US 10,621,724 B2
(45) Date of Patent: Apr. 14, 2020

(54) SYSTEM AND METHOD FOR IMAGE SEGMENTATION

(71) Applicant: SHENZHEN UNITED IMAGING HEALTHCARE CO., LTD., Shenzhen, Guangdong (CN)

(72) Inventor: Ce Wang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 222 days.

(21) Appl. No.: 15/721,779

(22) Filed: Sep. 30, 2017

(65) Prior Publication Data
US 2019/0066293 A1    Feb. 28, 2019

Related U.S. Application Data

(63) Continuation of application No. PCT/CN2017/100024, filed on Aug. 31, 2017.

(30) Foreign Application Priority Data

Sep. 30, 2017 (CN) .......................... 2017 1 0939388
Sep. 30, 2017 (CN) .......................... 2017 1 0944072

(51) Int. Cl.
*G06K 9/00*     (2006.01)
*G06T 7/00*     (2017.01)
(Continued)

(52) U.S. Cl.
CPC .......... *G06T 7/0014* (2013.01); *G06K 9/2054* (2013.01); *G06K 9/6202* (2013.01);
(Continued)

(58) Field of Classification Search
CPC .......... G06K 2209/055; G06K 9/2054; G06K 9/6202; G06K 9/6259; G06K 9/6267;
(Continued)

(56) References Cited

U.S. PATENT DOCUMENTS 8,649,577 B1 * 2/2014 Arnold .................. A61B 6/025
                                                          382/128
2007/0223795 A1 * 9/2007 Qing ..................... G06T 7/0012
                                                          382/128
(Continued)

FOREIGN PATENT DOCUMENTS

CN        101452577 A    6/2009
CN        102968783 A    3/2013
(Continued)

OTHER PUBLICATIONS

Ramakrishnan, Sowmya, et al. "Automatic three-dimensional rib centerline extraction from CT scans for enhanced visualization and anatomical context." Medical Imaging 2011: Image Processing. vol. 7962. International Society for Optics and Photonics, 2011. (Year: 2011).*

(Continued)

*Primary Examiner* — Avinash Yentrapati
(74) *Attorney, Agent, or Firm* — Metis IP LLC

(57) ABSTRACT

Methods and systems for image segmentation are provided. Image data may be acquired, wherein the image data may include a plurality of ribs. A rib region containing at least a portion of the plurality of ribs may be determined. At least one rib of the plurality of ribs may be selected as a target rib based on the rib region. At least one rib-probability-map relating to the target rib may be generated based on an artificial intelligence algorithm. A starting point of the target rib may be determined based on the image data, wherein the starting point may indicate a starting position for tracking the target rib. At least one portion of the target rib may be tracked based on the starting point and the at least one rib-probability-map. A segmented rib may be obtained by segmenting the at least one portion of the target rib.

20 Claims, 14 Drawing Sheets

(51) Int. Cl.
G06K 9/62 (2006.01)
G06T 7/73 (2017.01)
G06T 7/11 (2017.01)
G06T 7/187 (2017.01)
G06K 9/20 (2006.01)
G06T 7/143 (2017.01)

(52) U.S. Cl.
CPC ......... *G06K 9/6259* (2013.01); *G06K 9/6267* (2013.01); *G06T 7/11* (2017.01); *G06T 7/143* (2017.01); *G06T 7/187* (2017.01); *G06T 7/74* (2017.01); *G06T 2207/10028* (2013.01); *G06T 2207/20076* (2013.01); *G06T 2207/20156* (2013.01); *G06T 2207/30008* (2013.01); *G06T 2207/30012* (2013.01); *G06T 2207/30061* (2013.01)

(58) Field of Classification Search
CPC . G06T 2207/30008; G06T 2207/30004; G06T 2207/10028; G06T 2207/20076; G06T 2207/20156; G06T 2207/30012; G06T 2207/30061; G06T 7/0014; G06T 7/11; G06T 7/143; G06T 7/187; G06T 7/74
See application file for complete search history.

(56) References Cited

U.S. PATENT DOCUMENTS

| | | | |
|---|---|---|---|
| 2008/0137932 A1* | 6/2008 | Shen | G06T 7/0012 382/131 |
| 2008/0247646 A1 | 10/2008 | Chefd'Hotel et al. | |
| 2008/0260226 A1* | 10/2008 | Moriya | G06K 9/6201 382/128 |
| 2008/0317322 A1* | 12/2008 | Acharyya | G06T 7/0012 382/132 |
| 2009/0245608 A1* | 10/2009 | Wan | G06T 7/73 382/131 |
| 2013/0070996 A1* | 3/2013 | Liu | G06K 9/00 382/131 |
| 2013/0077841 A1* | 3/2013 | Wu | G06K 9/6207 382/131 |
| 2013/0108135 A1* | 5/2013 | Huo | G06T 7/12 382/132 |
| 2013/0150756 A1* | 6/2013 | Vitek | A61B 8/0875 601/2 |
| 2015/0078645 A1* | 3/2015 | El-Zehiry | G06T 7/11 382/131 |
| 2015/0154765 A1* | 6/2015 | Huo | G06T 11/005 382/132 |
| 2016/0180529 A1 | 6/2016 | Rai et al. | |
| 2017/0249744 A1* | 8/2017 | Wang | G06T 7/11 |
| 2017/0262978 A1* | 9/2017 | Reynolds | A61B 5/055 |

FOREIGN PATENT DOCUMENTS

| | | |
|---|---|---|
| CN | 104408734 A | 3/2015 |
| CN | 105678746 A | 6/2016 |
| CN | 105894517 A | 8/2016 |

OTHER PUBLICATIONS

Wu, Dijia, et al. "A learning based deformable template matching method for automatic rib centerline extraction and labeling in CT images." 2012 IEEE Conference on Computer Vision and Pattern Recognition. IEEE, 2012. (Year: 2012).*
Staal, Joes, Bram van Ginneken, and Max A. Viergever. "Automatic rib segmentation and labeling in computed tomography scans using a general framework for detection, recognition and segmentation of objects in volumetric data." Medical image analysis 11.1 (2007): 35-46. (Year: 2007).*
International Search Report in International Application No. PCT/CN2017/100024 dated May 25, 2018, 4 pages.
Writtern Opinion in International Application No. PCT/CN2017/100024 dated May 25, 2018, 4 pages.
Hong Shen et al. Tracing Based Segmentation for the Labeling of Individual Rib Structures in Chest CT Volume Data. MICCAI 2004, LNCS 3217, pp. 967-974 (2004).
Li Zhang et al. Automatic Rib Segmentation in Chest CT Volume. Data. International Conference on Biomedical Engineering and Biotechnology. pp. 750-753 (2012).
Joes Staal et al. Automatic Rib Segmentation in CT Data. Lecture Notes in Computer Science, pp. 193-204 (2004).
Joes Staal et al. Automatic rib segmentation and labeling in computed tomography scans using a general framework for detection, recognition and segmentation of objects in volumetric data. Medical Image Analysis 11, pp. 35-46 (2007).
Tobias Klinder et al. Automated Model-Based Rib Cage Segmentation and Labeling in CT Images. International Conference on Medical Image Computing & Computer-assisted Intervention. Med Image Comput Comput Assist Interv, pp. 195-202 ( 2007 ).
Qiang Wang, Image Segmentation and Registration for Bone Scintigraphy Images, A Dissertation Submitted to Shanghai Jiao Tong University for Master Degree of Engineering, 2012, 75 pages.

* cited by examiner

700

```
┌─────────────────────────────────────┐
│ Determining a trace direction range │ ～ 701
│ based on the image data             │
└─────────────────────────────────────┘
                  ↓
┌─────────────────────────────────────┐
│ Generating a classification-        │
│ probability-map within the trace    │ ～ 703
│ direction range based on a          │
│ classifier                          │
└─────────────────────────────────────┘
                  ↓
┌─────────────────────────────────────┐
│ Determining a trace direction based │
│ on the classification-probability-  │ ～ 705
│ map to obtain a predicted rib       │
│ segment                             │
└─────────────────────────────────────┘
                  ↓
┌─────────────────────────────────────┐
│ Matching the predicted rib segment  │ ～ 707
│ with one or more rib models         │
└─────────────────────────────────────┘
                  ↓
┌─────────────────────────────────────┐
│ Performing model reconstruction to  │ ～ 709
│ obtain a reconstructed model        │
└─────────────────────────────────────┘
```

FIG. 7B

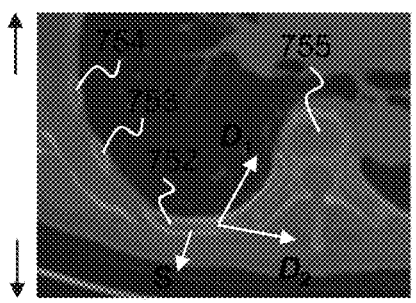
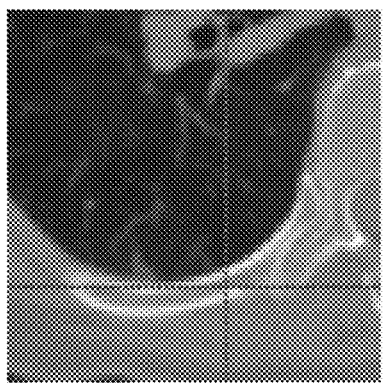
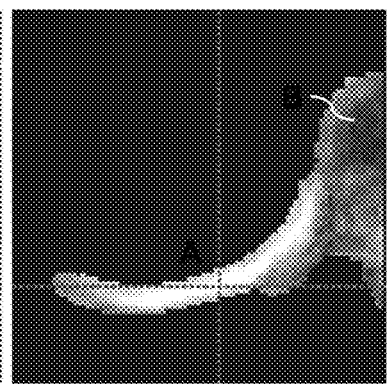

FIG. 7C   FIG. 7D   FIG. 7E

Example 1

Example 2

Example 3

Example 4

SYSTEM AND METHOD FOR IMAGE SEGMENTATION

CROSS-REFERENCE TO RELATED APPLICATIONS

This present application is a continuation of International Application No. PCT/CN2017/100024, filed on Aug. 31, 2017, and also claims priority to Chinese Application Nos. 201710939388.5 and 201710944072.5, filed on Sep. 30, 2017, the contents of each of which are hereby incorporated by reference.

TECHNICAL FIELD

The present disclosure generally relates to image processing, and more particularly, a system and method for rib recognition and segmentation.

BACKGROUND

Medical imaging has been widely used today. Segmentation and/or labelling of ribs in a medical image may serve as a foundation for analyzing the anatomical structure of ribs and/or diagnosis of various kinds of diseases. Manual segmentation and/or labelling of ribs may be time consuming. Automatic segmentation and/or labelling may be a challenging task due to one or more factors including, for example, an unclear rib boundary, a rib may be adhesive to another bone, and a missing rib or a missing part of a rib because of, e.g., a pathological condition, or the like, or a combination thereof. Therefore, it may be desirable to develop an effective method and system for rib segmentation and/or labelling that may solve the problems mentioned above.

SUMMARY

One aspect of the present disclosure relates to a first method for processing an image. The method may be implemented on at least one machine each of which has at least one processor and one storage. The method may include one or more of the following operations. Image data may be acquired, wherein the image data may include a plurality of ribs. A rib region containing at least a portion of the plurality of ribs may be determined. At least one rib of the plurality of ribs may be selected as a target rib based on the rib region. At least one rib-probability-map relating to the target rib may be generated based on an artificial intelligence algorithm. A starting point of the target rib may be determined based on the image data, wherein the starting point may indicate a starting position for tracking the target rib. At least one portion of the target rib may be tracked based on the starting point and the at least one rib-probability-map. A segmented rib may be obtained by segmenting the at least one portion of the target rib.

Another aspect of the present disclosure relates to a first non-transitory computer readable medium storing instructions. The instructions, when executed by at least one processor, may cause the at least one processor to implement the first method.

A further aspect of the present disclosure relates to a first system for processing an image. The first system may include at least one processor and a storage configured to store instructions. The instructions, when executed by the at least one processor, may cause the first system to effectuate the first method.

A further aspect of the present disclosure relates to a second system for processing an image. The second system may include at least one processor and a storage configured to store instructions. The second system may include an image acquisition module configured to acquire image data, the image data including a plurality of ribs; a rib pre-segmentation sub-module configured to determine a rib region containing at least a portion of the plurality of ribs, and select at least one rib of the plurality of ribs as a target rib based on the rib region; a classification-probability-map determination block configured to generate at least one rib-probability-map relating to the target rib based on an artificial intelligence algorithm; a starting point determination unit configured to determine a starting point of the target rib based on the image data, the starting point indicating a starting position for tracking the target rib; a rib model tracking unit configured to track at least one portion of the target rib based on the starting point and the at least one rib-probability-map; and a rib boundary extraction unit configured to obtain a segmented rib by segmenting the at least one portion of the target rib.

A further aspect of the present disclosure relates to a second method for processing an image. The method may be implemented on at least one machine each of which has at least one processor and one storage. The method may include one or more of the following operations. Image data may be acquired, wherein the image data may include a plurality of voxels corresponding to a first plurality of ribs of an object, a reference voxel relating to a reference organ of the object. A first plurality of seed points for the first plurality of ribs may be identified. The first plurality of identified seed points may be labelled to obtain labelled seed points. A connected domain of a target rib of the first plurality of ribs may be determined based on at least one rib segmentation algorithm. The connected domain of the target rib may be labelled based on a hit-or-miss operation, wherein the connected domain may include at least one of the labelled seed points, and wherein the hit-or-miss operation may be performed using the labelled seed points to hit the connected domain of the target rib.

A further aspect of the present disclosure relates to a second non-transitory computer readable medium storing instructions. The instructions, when executed by at least one processor, may cause the at least one processor to implement the second method.

A further aspect of the present disclosure relates to a third system for processing an image. The third system may include at least one processor and a storage configured to store instructions. The instructions, when executed by the at least one processor, may cause the third system to effectuate the second method.

A further aspect of the present disclosure relates to a fourth system for processing an image. The fourth system may include at least one processor and a storage configured to store instructions. The fourth system may include an image acquisition module configured to acquire image data, the image data including a plurality of voxels corresponding to a first plurality of ribs of an object, a reference voxel relating to a reference organ of the object; a seed point determination sub-module configured to identify a first plurality of seed points for the first plurality of ribs; a rib pre-segmentation sub-module configured to determine a connected domain of a target rib of the first plurality of ribs based on at least one rib segmentation algorithm; and a rib labelling sub-module configured to label the first plurality of identified seed points to obtain labelled seed points, and label the connected domain of the target rib based on a hit-or-miss operation, wherein the connected domain includes at least one of the labelled seed points, and wherein the hit-or-miss operation is performed using the labelled seed points to hit the connected domain of the target rib.

A further aspect of the present disclosure relates to a third method for processing an image. The method may be implemented on at least one machine each of which has at least one processor and one storage. The method may include one or more of the following operations. A medical image may be acquired, wherein the medical image may include a plurality of voxels corresponding to a plurality of ribs. A plurality of seed points of a plurality of first connected domains of the plurality of ribs may be identified based on a recognition algorithm. The medical image may be segmented to obtain a plurality of second connected domains of the plurality of ribs. The plurality of ribs may be labelled by matching the first connected domains including the plurality of seed points with the second domains of the plurality of ribs.

A further aspect of the present disclosure relates to a third non-transitory computer readable medium storing instructions. The instructions, when executed by at least one processor, may cause the at least one processor to implement the third method.

A further aspect of the present disclosure relates to a fifth system for processing an image. The fifth system may include at least one processor and a storage configured to store instructions. The instructions, when executed by the at least one processor, may cause the fifth system to effectuate the third method.

A further aspect of the present disclosure relates to a sixth system for processing an image. The sixth system may include at least one processor and a storage configured to store instructions. The sixth system may include an image acquisition module configured to acquire a medical image, the medical image including a plurality of voxels corresponding to a plurality of ribs; a seed point determination sub-module configured to identify a plurality of seed points of a plurality of first connected domains of the plurality of ribs based on a recognition algorithm; a rib pre-segmentation sub-module configured to segment the medical image to obtain a plurality of second connected domains of the plurality of ribs; and a rib labelling sub-module configured to label the plurality of ribs by matching the first connected domains including the plurality of seed points with the second domains of the plurality of ribs.

In some embodiments, the selection of at least one rib of the plurality of ribs as a target rib based on the rib region may include one or more of the following operations. A seed point for the at least one rib of the plurality of ribs may be determined. Pre-segmentation may be performed based on the image data and the seed point to obtain a preliminary rib. The preliminary rib may be designated as the target rib for further segmentation based on a determination that the preliminary rib is adhesive to a vertebra. The preliminary rib may be designated as the segmented rib based on a determination that the preliminary rib is not adhesive to a vertebra.

In some embodiments, the determination of a starting point of the target rib may include one or more of the following operations. A histogram may be determined based on a plurality of image layers of the target rib in a coronal plane. A characteristic point of the target rib may be designated as the starting point based on the histogram.

In some embodiments, the determination of a histogram may include one or more of the following operations. A plurality of rib pixels or voxels of the plurality of image layers may be superimposed along an anterior-posterior direction to obtain a diagram, wherein each element at a position of the diagram may represent a total number of pixels or voxels that are located at a corresponding position in one or more of the plurality of image layers and belong to a portion of the plurality of rib pixels or voxels, and wherein each pixel or voxel of the portion of the plurality of rib pixels or voxels may have a gray value larger than a first threshold. A plurality of elements of the diagram may be superimposed along a superior-inferior direction to obtain the histogram, wherein each element of the histogram may represent a sum of elements belonging to a portion of the plurality of elements, and wherein all of the portion of the plurality of elements may have a same position in a left-right direction.

In some embodiments, the characteristic point may be determined based on a position in the histogram, wherein a point at the position may have a minimum value in the histogram.

In some embodiments, the generation of at least one rib-probability-map relating to the target rib may include one or more of the following operations. The at least one rib-probability-map may be generated based on a classifier, wherein the classifier may be trained based on the artificial intelligence algorithm and a plurality of images relating to at least one sample rib.

In some embodiments, the tracking of at least one portion of the target rib may include one or more of the following operations. A trace direction range may be determined based on the image data. A predicted rib segment may be determined based on the trace direction range and the at least one rib-probability-map to obtain the at least one portion of the target rib.

In some embodiments, the determination of a predicted rib segment may include one or more of the following operations. At least one portion of the at least one rib-probability-map may be determined within the trace direction range. A trace direction may be determined based on the at least one portion of the at least one rib-probability-map. The predicted rib segment may be predicted based on the trace direction.

In some embodiments, the tracking of at least one portion of the target rib may further include one or more of the following operations. The predicted rib segment may be matched with at least one rib model.

In some embodiments, the first method may further include one or more of the following operations. The tracking of the at least one portion of the target rib may be terminated based on a determination that the predicted rib segment does not match with the at least one rib model.

In some embodiments, the first method may further include one or more of the following operations. Based on a determination that the predicted rib segment does not match with the at least one rib model, model reconstruction may be performed based on a plurality of matched rib segments to obtain a reconstructed model; at least one portion of the target rib may be extracted based on the plurality of matched rib segments.

In some embodiments, the first method may further include one or more of the following operations. Based on a determination that the predicted rib segment matches with the at least one rib model, the predicted rib segment may be designated as a matched rib segment of the target rib; a next rib segment of the target rib may be tracked based on the matched rib segment of the target rib and the at least one rib-probability-map.

In some embodiments, the target rib may have a first end and a second end, wherein the first end of the target rib may be spaced from a vertebra by a first distance, and the second end of the target rib may be spaced from the vertebra by a second distance, and the first distance may be larger than the second distance.

In some embodiments, the determination of a starting point of the target rib may include one or more of the following operations. A point of the target rib closer to the second end than to the first end of the target rib may be designated as the starting point.

In some embodiments, the tracking of at least one portion of the target rib may include one or more of the following operations. The at least one portion of the target rib may be tracked from the starting point to the second end of the target rib.

In some embodiments, the obtaining of a segmented rib by segmenting the at least one portion of the target rib may include one or more of the following operations. A first portion of the target rib may be segmented using a first segmentation algorithm, wherein the first portion may include a region between the starting point and the first end of the target rib. The first portion of the target rib and the segmented rib may be combined to obtain the target rib.

In some embodiments, the first segmentation algorithm may be a region growing algorithm.

In some embodiments, the first method may further include one or more of the following operations. The segmented rib may be labelled.

In some embodiments, the identification of a first plurality of seed points for the first plurality of ribs may include one or more of the following operations. A middle image layer of the image data in a coronal plane near the middle of a lung of the object may be obtained. A second plurality of seed points of a second plurality of ribs may be identified in the middle image layer. A plurality of image layers in a transverse plane of the image data containing at least one residual rib not included in the middle image layer may be determined. At least one seed point of the at least one residual rib may be identified.

In some embodiments, the identification of a second plurality of seed points of a second plurality of ribs in the middle image layer may include one or more of the following operations. A lung mask may be obtained in the middle image layer. The lung mask may be dilated. The second plurality of seed points of the second plurality of ribs in the middle image layer may be identified based on the dilated lung mask.

In some embodiments, the labelling of the first plurality of identified seed points may include one or more of the following operations. The second plurality of identified seed points of the second plurality of ribs in the middle image layer and the at least one seed point of the at least one residual rib may be labelled based on an anatomical structure of the first plurality of ribs and the reference organ to obtain labelled seed points.

In some embodiments, the labelling of the first plurality of identified seed points may include one or more of the following operations. A first seed point of a first rib may be labelled based on a position of the reference voxel. A relative position between the first seed point of the first rib and a second seed point of a second rib may be determined. The second seed point of the second rib may be labelled based on the relative position between the first seed point and the second seed point.

In some embodiments, the reference voxel may relate to an apex of a lung of the object or a base of a liver of the object.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7B is a flowchart illustrating an exemplary process for rib model tracking according to some embodiments of the present disclosure;

FIG. 7C illustrates an exemplary trace direction range of rib model tracking according to some embodiments of the present disclosure;

FIG. 7D illustrates an exemplary original rib image according to some embodiments of the present disclosure;

FIG. 7E illustrates an exemplary classification probability map according to some embodiments of the present disclosure;

DETAILED DESCRIPTION

In the following detailed description, numerous specific details are set forth by way of example in order to provide a thorough understanding of the relevant application. However, it should be apparent to those skilled in the art that the present application may be practiced without such details. In other instances, well known methods, procedures, systems, components, and/or circuitry have been described at a relatively high-level, without detail, in order to avoid unnecessarily obscuring aspects of the present application. Various modifications to the disclosed embodiments will be readily apparent to those skilled in the art, and the general principles defined herein may be applied to other embodiments and applications without departing from the spirit and scope of the present application. Thus, the present application is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by another expression if they may achieve the same purpose.

Figure 2:
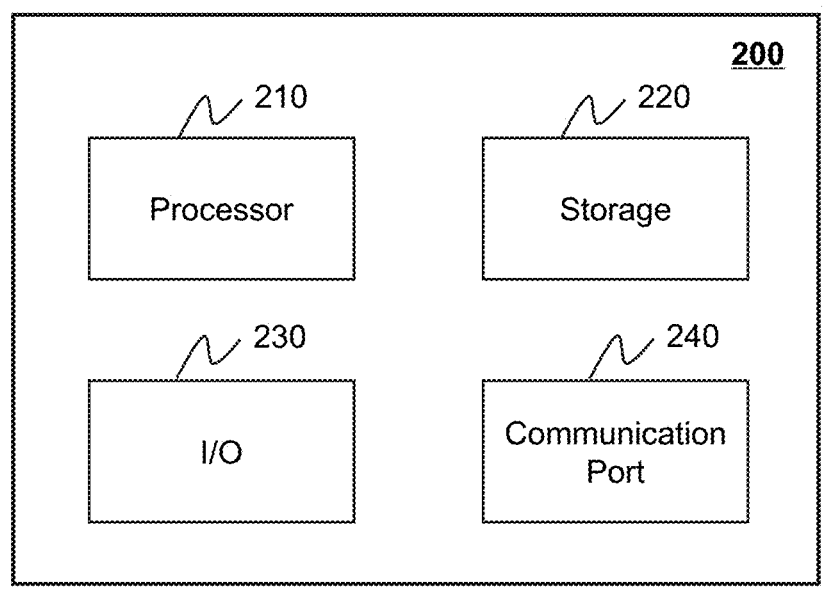
FIG. 2 is a schematic diagram illustrating exemplary hardware and/or software components of an exemplary computing device on which the processing engine may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, module or block is referred to as being "on," "connected to," "communicate with," "coupled to" another unit, module, or block, it may be directly on, connected or coupled to, or communicate with the other unit, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In an image processing, an image segmentation (or "recognition," "classification," "extraction," "determination," "identification," etc.) may be performed to provide an image for a target region by dividing or partitioning an image of a larger region including the target region. In some embodiments, the imaging system may include one or more modalities including Digital Subtraction Angiography (DSA), Magnetic Resonance Imaging (MRI), Magnetic Resonance Angiography (MRA), Computed tomography (CT), Computed Tomography Angiography (CTA), Ultrasound Scanning (US), Positron Emission Tomography (PET), Single-Photon Emission Computerized Tomography (SPECT), CT-MR, CT-PET, CE-SPECT, DSA-MR, PET-MR, PET-US, SPECT-US, TMS (transcranial magnetic stimulation)-MR, US-CT, US-MR, X-ray-CT, X-ray-MR, X-ray-portal, X-ray-US, Video-CT, Vide-US, or the like, or any combination thereof. In some embodiments, the target region may be an organ, a texture, an object, a lesion, a tumor, or the like, or any combination thereof. Merely by way for example, the target region may include a head, a breast, a lung, a rib, a vertebra, a trachea, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof. In some embodiments, the image may include a 2D image and/or a 3D image. In the 2D image, its tiniest distinguishable element may be termed as a pixel. In the 3D image, its tiniest distinguishable element may be termed as a voxel ("a volumetric pixel" or "a volume pixel"). In some embodiments, the 3D image may also be seen as a series of 2D slices or 2D layers.

The segmentation process may be performed by recognizing one or more characteristic values or features of one or more pixels and/or voxels in an image. In some embodiments, the characteristic values or features may include a gray level, a mean gray level, an intensity, texture, color, contrast, brightness, or the like, or any combination thereof. In some embodiments, one or more spatial properties of the pixel(s) and/or voxel(s) may also be considered in a segmentation process.

For brevity, an image, or a portion thereof (e.g., a region of interest (ROI) in the image) corresponding to an object (e.g., a tissue, an organ, a tumor, etc., of a subject (e.g., a patient, etc.)) may be referred to as an image, or a portion of thereof (e.g., an ROI) of or including the object, or the object itself. For instance, an ROI corresponding to the image of a rib may be described as that the ROI includes a rib. As another example, an image of or including a rib may be referred to a rib image, or simply a rib. For brevity, that a portion of an image corresponding to an object is processed (e.g., extracted, segmented, etc.) may be described as the object is processed. For instance, that a portion of an image corresponding to a rib is extracted from the rest of the image may be described as that the rib is extracted.

An aspect of the present disclosure relates to an image processing system and method for recognizing and/or segmenting ribs. To segment a rib, the system and method may determine a starting point of the rib, segment the rib using artificial intelligence based model tracking based on the starting point, and/or extract the rib. The system and method may also label the segmented rib based on one or more labelled seed points of the rib. The seed points of the rib may be determined based on a relative position of one or more pixels or voxels of the rib and a lung in a transverse plane of an image of the rib.

For illustration purposes, the following description is provided with reference to a segmentation process. It is understood that this is not intended to limit the scope of the present disclosure. For persons having ordinary skills in the art, a certain amount of variations, changes and/or modifications may be deducted under the guidance of the present disclosure. Those variations, changes and/or modifications do not depart from the scope of the present disclosure.

Figure 1A:
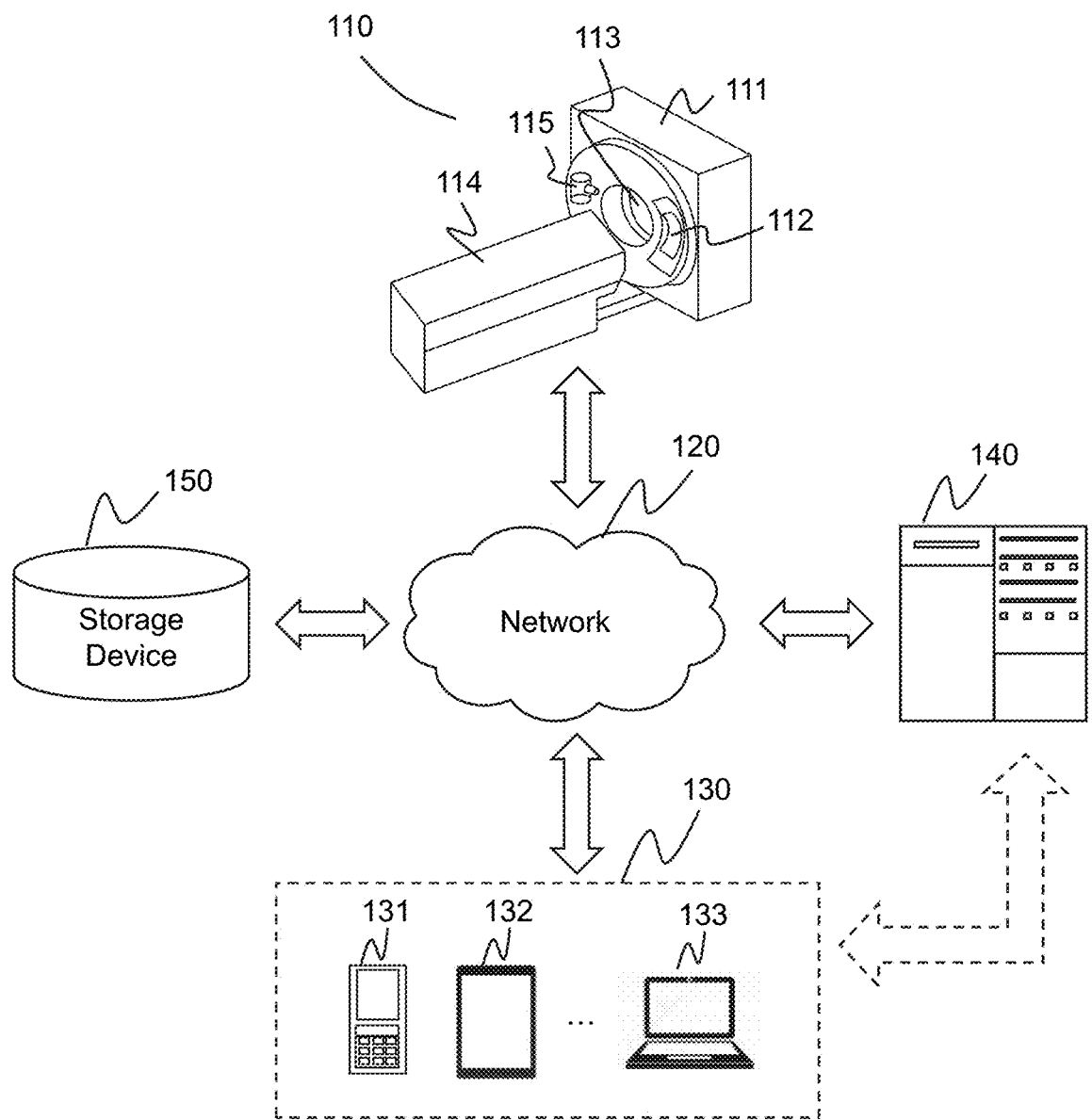
FIGS. 1A and 1B are schematic diagrams illustrating an exemplary imaging system according to some embodiments of the present disclosure.
Figure 1B:
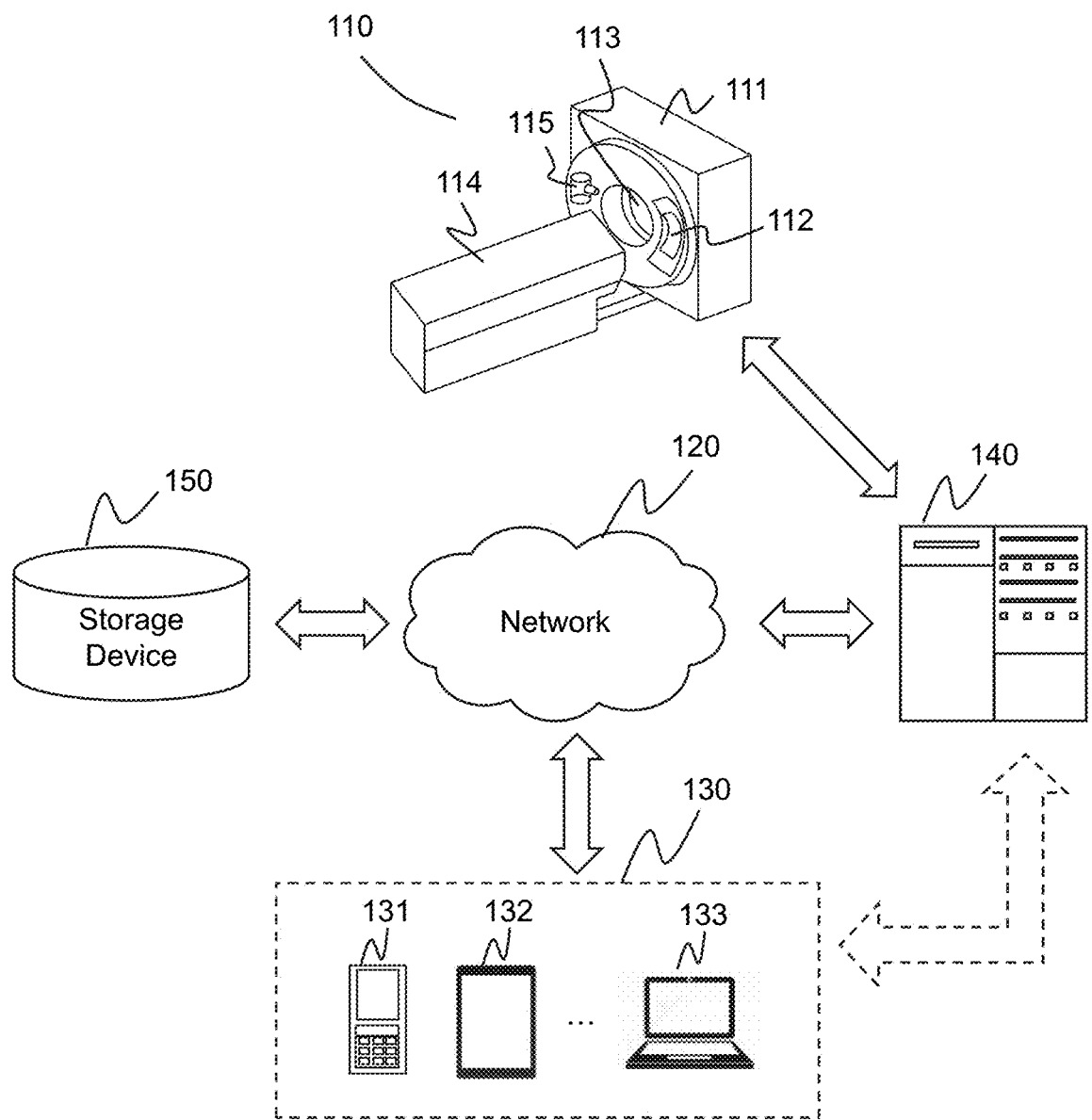

FIGS. 1A and 1B are schematic diagrams illustrating an exemplary imaging system 100 according to some embodiments of the present disclosure. As shown, the imaging system 100 may include a scanner 110, a network 120, one or more terminals 130, a processing engine 140, and a storage device 150. The components in the imaging system 100 may be connected in one or more of variable ways. Merely by way of example, as illustrated in FIG. 1A, the scanner 110 may be connected to the processing engine 140 through the network 120. As another example, as illustrated in FIG. 1B, the scanner 110 may be connected to the processing engine 140 directly. As a further example, the storage device 150 may be connected to the processing engine 140 directly or through the network 120. As still a further example, a terminal 130 may be connected to the processing engine 140 directly or through the network 120.

The scanner 110 may scan an object, and/or generate a plurality of data relating to the object. In some embodiments, the scanner 110 may be a medical imaging device, for example, a PET device, a SPECT device, a CT device, an MRI device, or the like, or any combination thereof (e.g., a PET-CT device, a PET-MRI device, or a CT-MRI device). The scanner 110 may include a gantry 111, a detector 112, a detection region 113, and a table 114. In some embodiments, the scanner 110 may also include a radioactive scanning source 115. The gantry 111 may support the detector 112 and the radioactive scanning source 115. A subject may be placed on the table 114 for scanning. In the present disclosure, "object" and "subject" are used interchangeably. The radioactive scanning source 115 may emit radioactive rays to the subject. The detector 112 may detect radiation events (e.g., gamma photons) emitted from the detection region 113. In some embodiments, the detector 112 may include one or more detector units. The detector units may include a scintillation detector (e.g., a cesium iodide detector), a gas detector, etc. The detector unit may be and/or include a single-row detector and/or a multi-rows detector.

The network 120 may include any suitable network that can facilitate exchange of information and/or data for the imaging system 100. In some embodiments, one or more components of the imaging system 100 (e.g., the scanner 110, the terminal 130, the processing engine 140, the storage device 150, etc.) may communicate information and/or data with one or more other components of the imaging system 100 via the network 120. For example, the processing engine 140 may obtain image data from the scanner 110 via the network 120. As another example, the processing engine 140 may obtain user instructions from the terminal 130 via the network 120. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 130 may be part of the processing engine 140.

The processing engine 140 may process data and/or information obtained from the scanner 110, the terminal 130, and/or the storage device 150. For example, the processing engine 140 may process image data and determine a regularization item that may be used to modify the image data. In some embodiments, the processing engine 140 may be a single server or a server group. The server group may be centralized or distributed. In some embodiments, the processing engine 140 may be local or remote. For example, the processing engine 140 may access information and/or data stored in the scanner 110, the terminal 130, and/or the storage device 150 via the network 120. As another example, the processing engine 140 may be directly connected to the scanner 110, the terminal 130 and/or the storage device 150 to access stored information and/or data. In some embodiments, the processing engine 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing engine 140 may be implemented by a computing device 200 having one or more components as illustrated in FIG. 2.

The storage device 150 may store data, instructions, and/or any other information. In some embodiments, the storage device 150 may store data obtained from the terminal 130 and/or the processing engine 140. In some embodiments, the storage device 150 may store data and/or instructions that the processing engine 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components in the imaging system 100 (e.g., the processing engine 140, the terminal 130, etc.). One or more components of the imaging system 100 may access the data or instructions stored in the storage device 150 via the network 120. In some embodiments, the storage device 150 may be directly connected to or communicate with one or more other components in the imaging system 100 (e.g., the processing engine 140, the terminal 130, etc.). In some embodiments, the storage device 150 may be part of the processing engine 140.

FIG. 2 is a schematic diagram illustrating exemplary hardware and/or software components of an exemplary computing device 200 on which the processing engine 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing engine 140 in accordance with techniques described herein. The computer instructions may include, for example, routines, programs, objects, components, data structures, procedures, modules, and functions, which perform particular functions described herein. For example, the processor 210 may process image data obtained from the scanner 110, the terminal 130, the storage device 150, and/or any other component of the imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the scanner 110, the terminal 130, the storage device 150, and/or any other component of the imaging system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 140 for determining a regularization item.

The I/O 230 may input and/or output signals, data, information, etc. In some embodiments, the I/O 230 may enable a user interaction with the processing engine 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 140 and the scanner 110, the terminal 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
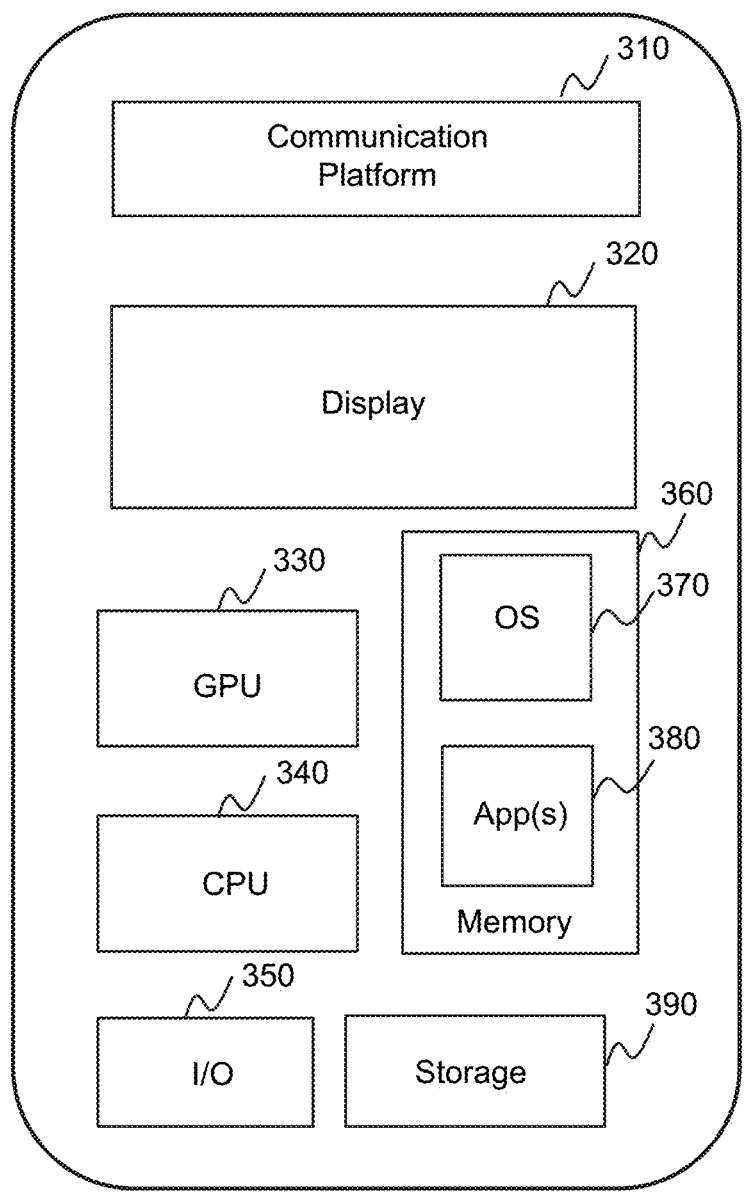
FIG. 3 is a schematic diagram illustrating exemplary hardware and/or software components of an exemplary mobile device on which the terminal may be implemented according to some embodiments of the present disclosure.

FIG. 3 is a schematic diagram illustrating exemplary hardware and/or software components of an exemplary mobile device 300 on which the terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 140. User interactions with the information stream may be achieved via the I/O 350 and provided to the processing engine 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4A:
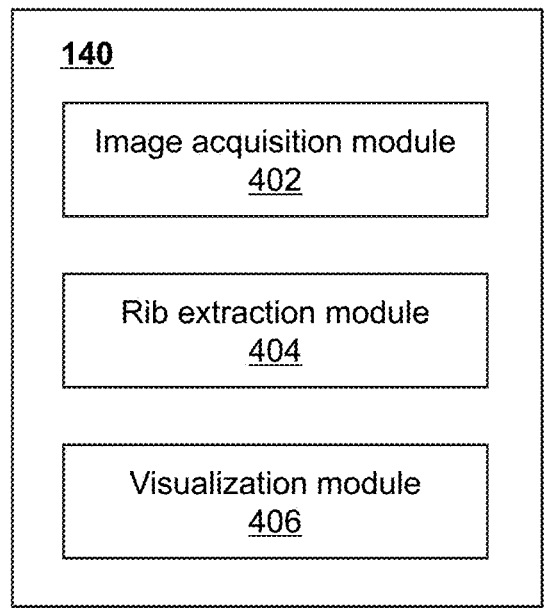
FIG. 4A is a schematic diagram illustrating an exemplary processing engine according to some embodiments of the present disclosure.

FIG. 4A is a schematic diagram illustrating an exemplary processing engine 140 according to some embodiments of the present disclosure. The processing engine 140 may include an image acquisition module 402, a rib extraction module 404, and a visualization module 406. At least a portion of the processing engine 140 may be implemented on a computing device as illustrated in FIG. 2 or a mobile device as illustrated in FIG. 3.

The image acquisition module 402 may acquire image data. The image acquisition module 402 may acquire the image data from the scanner 110 or the storage device 150. In some embodiments, the image acquisition module 402 may acquire the image data from an external data source via the network 120. In some embodiments, the image data may correspond to X-rays that pass through a subject. In some embodiments, the radioactive scanning source 115 may emit the X-rays to the subject. The X-rays may pass through the subject and may attenuate during the passing-through. The extent of attenuation of an X-ray may depend on factors including, for example, the property of one or more tissues the X-ray passes through, the thickness of a tissue that the X-ray passes through, etc. The attenuated X-rays may be detected by the detector 112 and transmitted to the image acquisition module 402. The image acquisition module 402 may acquire image data at various times, via various devices and/or under various conditions (e.g., weather, illuminance, scanning position and angle, etc.). In some embodiments, the image acquisition module 402 may acquire a reference voxel relating to a reference organ of an object.

The image data may relate to one or more parts of a subject. In some embodiments, the image data may be generated by a full scanning of a subject using the scanner 110, and the image data may include information regarding the whole subject. In some embodiments, the image data may be generated by a scanning of a portion of the subject using the scanner 110, and the image data may include information relating to a portion of the subject, for example, a chest, a trunk, an upper limb, a lower limb, a head, an organ, a tissue, etc. The image data of the subject may be 2D image data or 3D image data. The 3D image data may include a plurality of voxels. The 2D image data may include a plurality of pixels. The image data of the subject may be MRI image data, CT image data, and/or PET image data, or the like, or any combination thereof. The image data may include original data generated from the scanner 110, data processed based on the original data, parameters for image processing, or the like, or a combination thereof. In some embodiments, the image data may include data associated with one or more ribs, one or more other bones (e.g., a vertebra, a sternum, a scapula, a clavicle, etc.), and/or one or more other organs/tissues (e.g., a lung, a blood vessel, etc.). In some embodiments, a rib represented by one or more pixels/voxels may be adhesive to another bone (e.g., a vertebra) represented by one or more pixels/voxels in the image data.

Figure 5A:
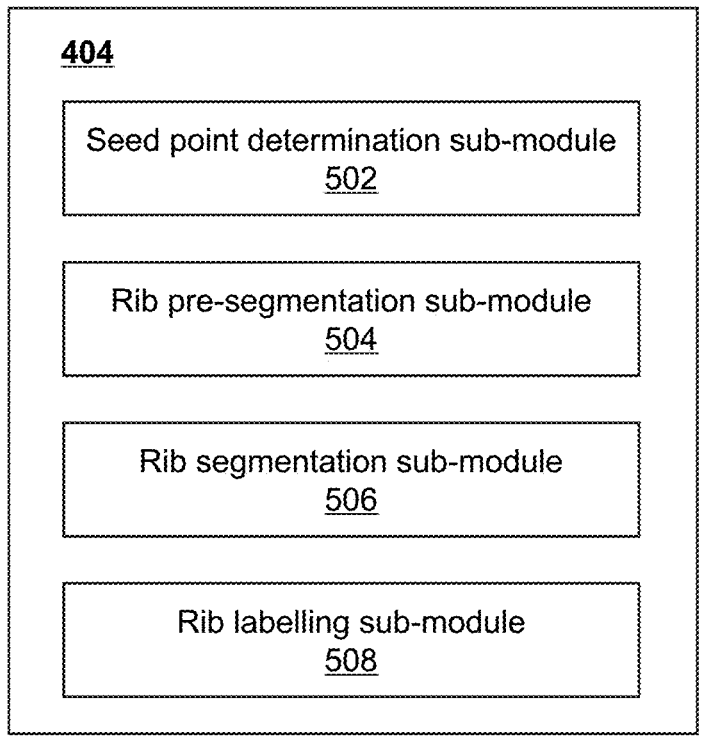
FIG. 5A is a schematic diagram illustrating an exemplary rib extraction module according to some embodiments of the present disclosure.

The rib extraction module 404 may extract one or more ribs. The rib extraction module 404 may include one or more sub-modules, as illustrated in FIG. 5A. For convenience, a rib may refer to a set of pixels/voxels representing a rib structure in the image data. A human body may have 12 pairs of ribs (i.e., 24 individual ribs). In some embodiments, a rib may be at one end connected to a vertebra. In some embodiments, the rib may be also connected to a sternum at the other end. The two lungs and the liver of a subject may be located within the rib cage formed by the 12 pairs of ribs. Among the 12 pairs of ribs, the pair of ribs closest to the head of a subject may be named as the first pair of ribs, while the pair of ribs farthest away from the head may be named as the twelfth pair of ribs. Other 10 pairs of ribs may be successively named as the second pair of ribs, the third pair of ribs, until the eleventh pair of ribs, in an order from the first pair to the twelfth pair. For a pair of ribs, a rib close to the right hand may be referred to as a right rib, while a rib close to the left hand may be referred to as a left rib. For example, for the first pair of ribs, the rib close to the right hand may be named as the first right rib, while the rib close to the left hand may be named as the first left rib. Other individual ribs may be named likewise. The first left rib may be close to the apex of the left lung, while the first right rib may be close to the apex of the right lung. The eleventh and/or the twelfth right rib may be close to a lower border of the liver.

The rib extraction module 404 may extract rib(s) based on the image data acquired by the image acquisition module 402. The extracted rib(s) may include the set of pixels/voxels representing the rib(s) structure in the image data. In some embodiments, the extracted rib(s) may include pixels/voxels at a boundary of the rib(s) and/or pixels/voxels within the boundary. In some embodiments, the extracted rib(s) may include one or more pixels/voxels not belonging to the rib(s). For example, the extracted rib(s) may include one or more pixels/voxels representing another bone (e.g., a vertebra, a sternum, a scapula, a clavicle, etc.), another tissue (e.g., a lung, a blood vessel, etc.), etc. The rib extraction module 404 may extract the rib(s) based on one or more segmentation algorithms mentioned in the present disclosure.

The visualization module 406 may visualize the extracted rib(s) and/or image data. The visualization module 406 may convert the image data and/or the extracted rib(s) into a visual format including, for example, an image. The image may be a grayscale image or a color image. The image may be a 2D image or a 3D image. The image may be shown via a display device (e.g., the I/O 230, the display 320, etc.) or printed by a printer. The image may be presented to a user. In some embodiments, the image may be stored in a storage device (e.g., the storage device 150, the storage 220, the storage 390, etc.) for further analysis.

Figure 4B:
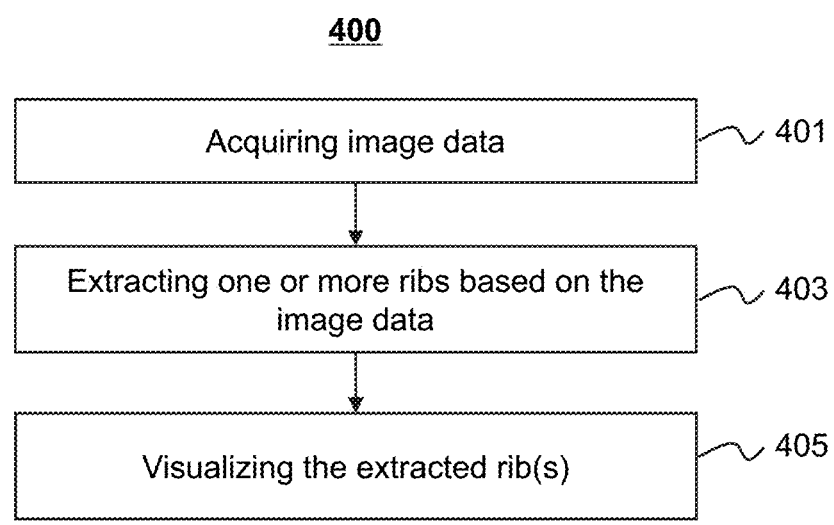
FIG. 4B is a flowchart illustrating an exemplary process for generating a rib image according to some embodiments of the present disclosure.

FIG. 4B is a flowchart illustrating an exemplary process 400 for generating a rib image according to some embodiments of the present disclosure. In some embodiments, the process 400 may be performed by the processing engine 140. The process 400 may include acquiring image data 401, extracting one or more ribs based on the image data 403, and visualizing the extracted ribs 405. At least a portion of the process 400 may be implemented on a computing device as illustrated in FIG. 2 or a mobile device as illustrated in FIG. 3.

In 401, image data of a subject may be acquired. The subject may be a human body, an animal, or any part thereof. For example, the subject may be an entire human body, an upper part of a human body, or the chest of a human body, etc. In some embodiments, the image data may be acquired by the image acquisition module 402. The image data may be acquired from the scanner 110, the storage device 150, and/or the terminal 130. In some embodiments, the image data may be acquired from the I/O 230 of the computing device 200 via the communication port 240. In some embodiments, the image data may be acquired from an external data source via the network 120. In some embodiments, the image data may be pre-processed to make the image data suitable for segmentation. The pre-processing may include image normalization, image reconstruction, image smoothing, suppressing, weakening and/or removing a detail, a mutation (e.g., a gray level mutation, etc.), noise, or the like, or any combination thereof.

In 403, one or more ribs may be extracted based on the image data acquired in 401. More descriptions of the rib extraction may be found elsewhere in the present disclosure. See, for example, FIG. 5B and the description thereof. In some embodiments, 403 may be performed by the rib extraction module 404. In 403, one or more pixels/voxels in the image data that correspond to rib(s) may be identified and/or extracted. The rib(s) may be extracted based on one or more segmentation algorithms. In some embodiments, the segmentation algorithms may include a threshold segmentation algorithm, a region growing segmentation algorithm, an energy-based 3D reconstruction segmentation algorithm, a level set-based segmentation algorithm, a region split and/or merge segmentation algorithm, an edge tracking segmentation algorithm, a statistical pattern recognition algorithm, a C-means clustering segmentation algorithm, a deformable model segmentation algorithm, a graph search segmentation algorithm, a neural network segmentation algorithm, a geodesic minimal path segmentation algorithm, a target tracking segmentation algorithm, an atlas-based segmentation algorithm, a rule-based segmentation algorithm, a coupled surface segmentation algorithm, a model-based segmentation algorithm, a deformable organism segmentation algorithm, a model matching algorithm, an artificial intelligence algorithm, or the like, or any combination thereof. In some embodiments, one or more segmentation algorithms may be stored in the storage device 150, the storage 220, the storage 390, or another mobile storage device (e.g., a mobile hard disk, a USB flash disk, or the like, or a combination thereof). In some embodiments, the segmentation algorithms may be retrieved from one or more other external sources via the network 120.

In 405, the rib(s) extracted in 403 may be visualized. In some embodiments, 405 may be performed by the visualization module 406. The extracted rib(s) may be visualized based on one or more algorithms, such as an image conversion algorithm, an image display algorithm, or the like, or any combination thereof. The image conversion algorithm may be performed to convert the extracted rib(s) from a frequency domain into an image domain, from grayscale to color, etc. The image display algorithm may be performed to adjust color, contrast, brightness, etc. of the rib(s). In some embodiments, the rib(s) may be visualized together with a background (e.g., a chest, a vertebra, a sternum, a scapula, a clavicle, etc.).

In some embodiments, in 405, the extracted rib(s) may be post-processed. The post-processing may be performed based on techniques including, for example, a 2D post-processing technique, a 3D post-processing technique, or the like, or a combination thereof. Exemplary 2D post-processing techniques may include a multi-planar reformation (MPR), a curved planar reformation (CPR), a computed volume reconstruction (CVR), a volume rendering (VR), or the like, or any combination thereof. Exemplary 3D postprocessing technique may include a 3D surface reconstruction, a 3D volume reconstruction, a volume intensity projection (VIP), a maximum intensity projection (MIP), a minimum intensity projection (Min-IP), an average intensity projection (AIP), an X-ray simulation projection, a volume rendering (VR), or the like, or any combination thereof. Other techniques may include a repair process, a rendering process, a filling process, or the like, or any combination thereof. The repair process may restore a missing part (e.g., a rib fracture) of the extracted rib(s) based on information available in the existing part of the extracted rib(s). For example, the repair process may restore one or more missing pixels/voxels corresponding to an extracted rib based on one or more available pixels/voxels close to the missing pixel(s)/voxel(s).

It should be noted that the above description about the processing engine 140 and the process 400 for generating a rib image is merely provided for the purpose of illustration, and not intended to limit the scope of the present disclosure. For persons having ordinary skills in the art, multiple variations and/or modifications may be made under the teachings of the present disclosure. However, those variations and modifications do not depart from the scope of the present disclosure. For example, 403 and 405 may be combined into a single operation. As another example, after the extracted ribs in 405 is visualized, the process 400 may return to 403 for further extracting ribs in the image data. As still another example, 403 and 405 may be implemented simultaneously. One or more other operations may be added to process 400, or one or more operations may be omitted from process 400. For example, an operation for scanning the subject may be added before 401, which may be implemented by the scanner 110. As another example, an operation for storing data may be added between or after 401, 403, and/or 405. The data may be stored in the storage device 150, the storage 220, the storage 390, or an external database (not shown).

FIG. 5A is a schematic diagram illustrating an exemplary rib extraction module 404 according to some embodiments of the present disclosure. The rib extraction module 404 may include a seed point determination sub-module 502, a rib pre-segmentation sub-module 504, a rib segmentation sub-module 506, and a rib labelling sub-module 508. At least a portion of the rib extraction module 404 may be implemented on a computing device as illustrated in FIG. 2 or a mobile device as illustrated in FIG. 3.

The seed point determination sub-module 502 may determine one or more seed points of a rib. In some embodiments, a seed point may include a pixel/voxel defining an initial position for rib extraction. In some embodiments, a seed point may include a cluster of pixels/voxels defining an initial region for a rib extraction. A seed point may be pixel(s)/voxel(s) belonging to the rib. In some embodiments, a seed point may be one or more random pixels/voxels located in a region of the rib. In some embodiments, a seed point may be one or more characteristic pixels/voxels located in a region of the rib. A characteristic pixel/voxel may refer to a pixel/voxel having a characteristic value (e.g., a gray level, brightness, etc.) or a characteristic position. In some embodiments, the seed point determination sub-module 502 may determine the seed point(s) based on an anatomical structure of the subject. Subjects of a same species may have similar anatomical structures, and thus seed point(s) may be determined based on the anatomical structure. In some embodiments, the seed point determination sub-module 502 may determine the seed point(s) based on the position of a rib relative to an organ (e.g., a lung, a liver, etc.) of the subject. For example, the seed point(s) of a first left rib and/or a first right rib may be determined based on the position of an apex of a left lung and/or a right lung, and then the seed points of other ribs may be determined based on the seed point(s) of the first left rib and/or the first right rib. In some embodiments, the seed point determination sub-module 502 may determine the seed point(s) based on a threshold relating to an image-related value (e.g., a gray level). For example, pixels/voxels having a pixel value (e.g., a CT value, a gray level, etc.) within a threshold range may be designated as the seed point(s).

The rib pre-segmentation sub-module 504 may pre-segment one or more ribs based on the image data. In some embodiments, the rib pre-segmentation sub-module 504 may determine a portion of a plurality of pixels/voxels belonging to the rib(s) in the image data. In some embodiments, the rib pre-segmentation sub-module 504 may determine one or more rib regions. In some embodiments, the rib pre-segmentation sub-module 504 may select at least one rib of a plurality of ribs as a target rib based on the rib region(s). For example, the rib pre-segmentation sub-module 504 may perform pre-segmentation based on the image data and one or more seed points to obtain a preliminary rib. The rib pre-segmentation sub-module 504 may designate the preliminary rib as a target rib for further segmentation based on a determination that the preliminary rib is adhesive to a vertebra. The rib pre-segmentation sub-module 504 may designate the preliminary rib as a segmented rib based on a determination that the preliminary rib is not adhesive to a vertebra. The rib pre-segmentation sub-module 504 may determine a connected domain for a pre-segmented rib. In some embodiments, the rib(s) that can be relatively easily segmented may be extracted in pre-segmentation. The rib pre-segmentation sub-module 504 may pre-segment rib(s) based on one or more segmentation algorithms mentioned in the present disclosure. In some embodiments, the rib pre-segmentation sub-module 504 may employ a relatively simple algorithm, which may save time and accelerate the process of rib extraction. For example, the rib pre-segmentation sub-module 504 may pre-segment the rib(s) using an edge detection algorithm based on a Laplace operator. It should be noted that the rib pre-segmentation sub-module 504 may be unnecessary.

In some embodiments, the rib pre-segmentation sub-module 504 may determine whether the rib pre-segmentation is successful. In some embodiments, the determination may be performed based on position information of a pre-segmented rib and another bone (e.g., a vertebra, or the like). In some embodiments, the rib pre-segmentation may be determined to be unsuccessful when the pre-segmented rib(s) containing one or more pixels/voxels representing another bone (e.g., a vertebra, or the like); otherwise, the rib-segmentation may be determined to be successful. In some embodiments, the rib pre-segmentation sub-module 504 may successfully pre-segment one or more ribs that are not heavily adhesive to another bone. For a rib that is heavily adhesive to a bone, the rib may be connected to the bone, and a connected domain may be generated between the rib and the bone. It may be difficult to identify whether the connected domain belongs to the rib or the bone, or it may be difficult to distinguish the connected domain from the rib and/or the bone. For example, the connected domain may be generated between a joint of the rib and a joint of the bone. If the difference between a gray level of a pixel/voxel in the connected domain and a gray level of the rib or the bone is less than a threshold, it may indicate that it is difficult to distinguish the connected domain from the rib and/or the bone. As another example, if the distance between a boundary of the rib and a boundary of the bone is less than a threshold, the connected domain may be generated at the boundary of the rib and the boundary of the bone due to partial volume effect, and it may indicate that it is difficult to identify whether the connected domain belongs to the rib or the bone. For a rib that is not heavily adhesive to a bone, the rib may be connected to the bone, and a connected domain may be generated, but it may be relatively easy to identify whether the connected domain belongs to the rib or the bone, or it may be relatively easy to distinguish the connected domain from the rib and/or the bone. If the difference between a grey level of a pixel/voxel in the connected domain and a grey level of the rib or the bone is no less than a threshold, it may indicated that it is relatively easy to distinguish the connected domain from the rib and/or the bone. In some embodiments, no rib may be considered successfully pre-segmented. For example, a first set of pixels/voxels of rib(s) may overlap with a second set of pixels/voxels of another bone; meanwhile, the first set of pixels/voxels and the second set of pixels/voxels may have similar pixel values (e.g., CT values, gray levels, brightness, etc.). Thus, it may be difficult to distinguish the rib(s) from another bone, and the rib pre-segmentation may be considered unsuccessful.

The rib segmentation sub-module 506 may segment one or more rib(s) in the image data. The rib segmentation sub-module 506 may determine a connected domain for a segmented rib. In some embodiments, the rib segmentation sub-module 506 may segment rib(s) based on a rib pre-segmentation result. For example, the rib segmentation sub-module 506 may segment rib(s) that are not successfully segmented by the rib pre-segmentation sub-module 504. Thus the rib segmentation may be a further process based on the rib pre-segmentation result. In some embodiments, the rib segmentation sub-module 506 may segment the rib(s) independently of the rib pre-segmentation sub-module 504. Thus, the rib segmentation and the rib pre-segmentation may be performed independently. In some embodiments, the rib segmentation sub-module 506 may compare the rib segmentation result and the rib pre-segmentation result, and/or identify a rib based on the comparison. The rib segmentation sub-module 506 may include one or more units as described in FIG. 6A.

The rib segmentation sub-module 506 may employ one or more algorithms to segment rib(s). In some embodiments, the rib segmentation sub-module 506 may employ different algorithms to segment different portions of a rib in the image data. For example, the rib segmentation sub-module 506 may segment a first portion of a rib using a first algorithm (e.g., region growing, or the like), and segment a second portion of the rib using a second algorithm (e.g., model tracking, model matching, artificial intelligence algorithm, or the like) that is different from the first algorithm. In some embodiments, the rib segmentation sub-module 506 may employ a model tracking algorithm and/or an artificial intelligence algorithm (e.g., an artificial intelligence based model tracking algorithm) to segment a portion of a rib that is heavily adhesive to another bone. Using the model tracking algorithm, a segmentation leak may be prevented. A segmentation leak may refer to a segmentation error that determines a large number of non-rib pixels/voxels close to a rib region as rib pixels/voxels. A rib pixel/voxel may refer to a pixel/voxel representing a rib. A non-rib pixel/voxel may refer to a pixel/voxel not representing a rib. Using the artificial intelligence algorithm, the contrast between the rib(s) and other bones/organs in the image data may be enhanced, thus the accuracy and robustness of the segmentation may be improved. In some embodiments, the rib segmentation sub-module 506 may employ a single algorithm to segment an entire rib.

The rib labelling sub-module 508 may label one or more rib(s) segmented in the image data. Labelling may refer to identifying and/or naming the rib(s) in the image data. In some embodiments, the rib labelling sub-module 508 may label a rib based on the seed point(s) determined by the seed point determination sub-module 502, the rib pre-segmentation result obtained by the rib pre-segmentation sub-module 504, and/or the rib segmentation result obtained by the rib segmentation sub-module 506. For example, when a seed point belonging to a first left rib is within a spatial range of a rib to be labelled, the rib may be labelled as "first left rib."

In some embodiments, the rib labelling sub-module 508 may label one or more ribs that are manually segmented by a user (e.g., a doctor, or the like). For example, a lesion may appear in a fifth left rib of a patient, and the rib is not segmented automatically by the rib pre-segmentation sub-module 504 neither the rib segmentation sub-module 506. However, a seed point of the fifth left rib may be determined by the seed point determination sub-module 502. In this case, the user may manually segment the rib, and the rib labelling sub-module 508 may label the rib as "fifth left rib" if the seed point of the "fifth left rib" is within the connected domain of the manually segmented rib. In some embodiments, the rib labelling sub-module 508 may label one or more identified seed points to obtain labelled seed points. In some embodiments, the rib labelling sub-module 508 may label one or more connected domains (or regions) of a target rib based on a hit-or-miss operation, wherein the connected domain(s) (or region(s)) may include at least one of the labelled seed point(s), and wherein the hit-or-miss operation may be performed using the labelled seed point(s) to hit the connected domain(s) (or region(s)) of the target rib. In some embodiments, the rib labelling sub-module 508 may label a plurality of ribs by matching one or more first connected domains (or regions) including a plurality of seed points with one or more second domains (or regions) of the plurality of ribs.

It should be noted that the above description of the rib extraction module 404 is merely provided for the purpose of illustration, and not intended to limit the scope of the present disclosure. For persons having ordinary skills in the art, multiple variations and modifications may be made to the rib extraction module 404 under the teachings of the present disclosure. However, those variations and modifications do not depart from the scope of the present disclosure. For example, the rib pre-segmentation sub-module 504 may be removed, and there may be no rib pre-segmentation before the rib segmentation. As another example, the rib labelling sub-module 508 may be removed, and the rib extraction module 404 may only extract rib(s) without labelling the rib(s). As another example, the seed point determination sub-module 502 and the rib labelling sub-module 508 may be combined into a single sub-module.

Figure 5B:
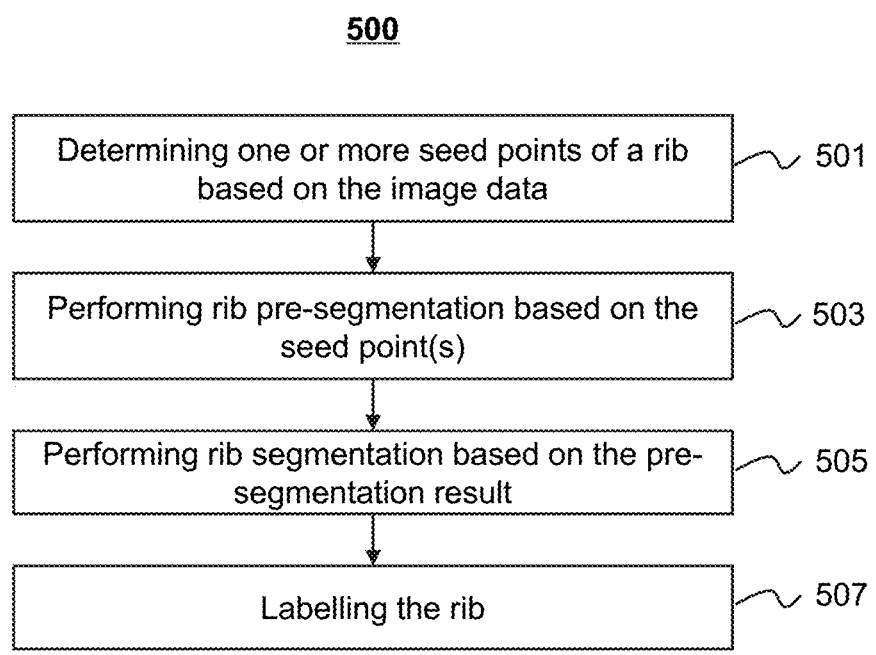
FIG. 5B is a flowchart illustrating an exemplary process for extracting a rib according to some embodiments of the present disclosure.

FIG. 5B is a flowchart illustrating an exemplary process 500 for extracting a rib according to some embodiments of the present disclosure. In some embodiments, the process 500 may be performed by the rib extraction module 404. At least a portion of the process 500 may be implemented on a computing device as illustrated in FIG. 2 or a mobile device as illustrated in FIG. 3.

In 501, one or more seed points of a rib may be determined based on the image data. In some embodiments, operation 501 may be performed by the seed point determination sub-module 502. The seed point(s) may be used as a starting point for a rib pre-segmentation and/or rib segmentation. In some embodiments, the seed point(s) may be determined based on an anatomical structure of the subject. In some embodiments, the seed point(s) may be determined based on the position of the rib relative to an organ (e.g., a lung, a liver, etc.) of the subject. For example, the seed point(s) of a first left rib and/or a first right rib may be determined based on the position of an apex of a lung, and then the seed points of other ribs may be determined based on the seed point(s) of the first left rib and/or the first right rib. Operation 501 may be performed automatically, semi-automatically, or manually. For example, the seed point(s) may be automatically determined as described above. As another example, a user may determine the seed point(s) through the I/O 230. As still another example, the user may modify, add, delete, or adjust the automatically determined seed point(s).

In 503, a rib pre-segmentation may be performed based on the seed point(s) determined in 501. In some embodiments, a connected domain may be determined in 503. The connected domain may include one or more pixels/voxels corresponding to the rib. In some embodiments, operation 503 may be performed by the rib pre-segmentation sub-module 504. The rib pre-segmentation may be performed based on one or more algorithms. In some embodiments, the rib pre-segmentation may be performed using an edge detection algorithm based on a Laplace operator. In some embodiments, whether the rib pre-segmentation is successful or not may be determined in 503. In some embodiments, the determination may be performed based on the position information of a pre-segmented rib and another bone (e.g., a vertebra, or the like). In some embodiments, the rib pre-segmentation may be determined to be unsuccessful when the pre-segmented rib contains one or more pixels/voxels representing another bone (e.g., a vertebra, or the like); otherwise, the rib-segmentation may be determined to be successful. In some embodiments, if the rib is not heavily adhesive to another bone, the rib pre-segmentation may be considered successful. In some embodiments, the rib pre-segmentation may be considered unsuccessful. For example, a first set of pixels/voxels of the rib may overlap with a second set of pixels/voxels of another bone; meanwhile, the first set of pixels/voxels and the second set of pixels/voxels may have similar pixel values (e.g., CT values, gray levels, brightness, etc.). Thus, it may be difficult to distinguish the rib from another bone, and the rib pre-segmentation may be considered unsuccessful. Operation 503 may be performed automatically, semi-automatically, or manually. For example, the rib may be automatically pre-segmented as described above. As another example, a user may pre-segment the rib through the I/O 230. As still another example, the user may modify, or adjust an automatically pre-segmented rib.

In 505, the rib may be segmented based on the rib pre-segmentation result. In some embodiments, operation 505 may be performed by the rib segmentation sub-module 506. In some embodiments, if the rib pre-segmentation is considered unsuccessful, the rib may be segmented in 505. The rib may be segmented based on one or more segmentation algorithms mentioned in the present disclosure. In some embodiments, different segmentation algorithms may be employed to segment different portions of the rib. For example, a first portion of the rib may be segmented using a first algorithm (e.g., region growing, or the like), while a second portion of the rib may be segmented using a second algorithm (e.g., model tracking, model matching, artificial intelligence algorithm, or the like) that is different from the first algorithm. In some embodiments, a model tracking algorithm and/or an artificial intelligence algorithm (e.g., an artificial intelligence based model tracking algorithm) may be employed to segment a portion of the rib that is heavily adhesive to another bone. Using the model tracking algorithm, a segmentation leak may be prevented. Using the artificial intelligence algorithm, the contrast between the rib and other bones/organs in the image data may be enhanced, and thus the accuracy and robustness of the segmentation may be improved. In some embodiments, a single algorithm (e.g., an artificial intelligence based model tracking) may be employed to segment the entire rib. In some embodiments, if the rib pre-segmentation is considered successful, operation 505 may be skipped. Operation 505 may be performed automatically, semi-automatically, or manually. For example, the rib may be automatically segmented as described above. As another example, a user may segment the rib manually through the I/O 230. As still another example, the user may modify, or adjust an automatically segmented rib.

In 507, the rib pre-segmented in 503, and/or the rib segmented in 505 may be labelled. In some embodiments, operation 507 may be performed by the rib labelling sub-module 508. In some embodiments, the rib may be labelled based on the seed point(s) determined in 501. The rib may be labelled based on a position of the rib and the seed point(s). For example, if a seed point belonging to a first left rib is within a spatial range of the rib to be labelled, the rib may be labelled as "first left rib." Operation 507 may be performed automatically, semi-automatically, or manually. For example, the rib may be automatically labelled as described above. As another example, a user may label the rib manually through the I/O 230. As still another example, the user may modify, or adjust an automatically labelled rib.

It should be noted that the above description of the process 500 is merely provided for the purpose of illustration, and not intended to limit the scope of the present disclosure. For persons having ordinary skills in the art, multiple variations and modifications may be made to the process 500 for rib extraction under the teachings of the present disclosure. However, those variations and modifications do not depart from the scope of the present disclosure. For example, operation 503 may be omitted. As another example, operations 503, 505, and/or 507 may be performed simultaneously. In some embodiments, each segmented rib may be labelled immediately after the rib is pre-segmented or segmented. In some embodiments, a rib may be labelled after all the ribs are pre-segmented or segmented.

Figure 6A:
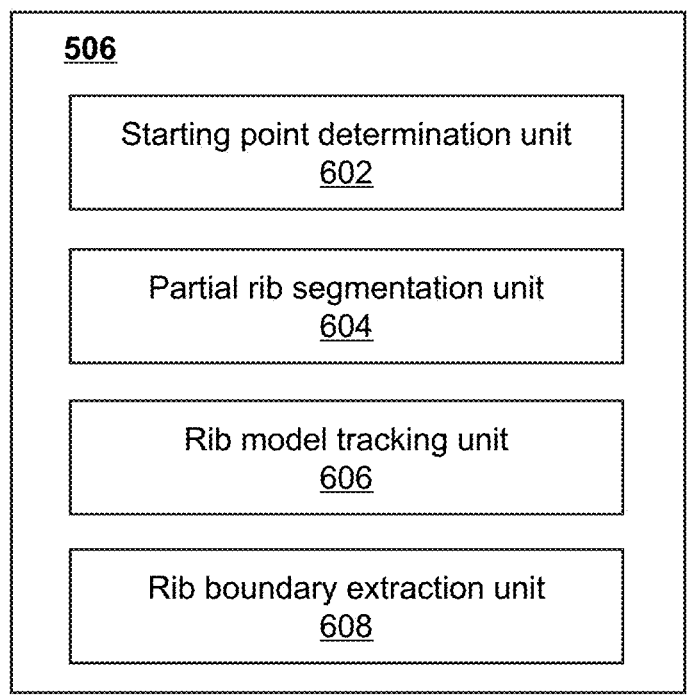
FIG. 6A is a schematic diagram illustrating an exemplary rib segmentation sub-module according to some embodiments of the present disclosure.

FIG. 6A is a schematic diagram illustrating an exemplary rib segmentation sub-module 506 according to some embodiments of the present disclosure. The rib segmentation sub-module 506 may include a starting point determination unit 602, a partial rib segmentation unit 604, a rib model tracking unit 606, and a rib boundary extraction unit 608. At least a portion of the rib segmentation sub-module 206 may be implemented on a computing device as illustrated in FIG. 2 or a mobile device as illustrated in FIG. 3.

The starting point determination unit 602 may determine one or more starting points for rib segmentation. A starting point may include one or more pixels/voxels representing a rib. In some embodiments, a starting point may indicate a starting position for tracking a target rib. A starting point may be the same as or different from a seed point determined by the seed point determination sub-module 502. The seed point(s) may provide a basis for rib pre-segmentation, while the starting point(s) may provide a basis for rib segmentation. In some embodiments, the starting point determination unit 602 may designate a rib pixel/voxel as a starting point randomly. In some embodiments, the starting point determination unit 602 may designate a rib pixel/voxel of a rib to be segmented as a starting point. A rib pixel/voxel may refer to a pixel/voxel representing the rib. In some embodiments, the starting point determination unit 602 may determine a starting point based on a threshold relating to an image-related value (e.g., a gray level). The threshold may be the same as or different from the threshold applied when determining a seed point of a rib. In some embodiments, the starting point determination unit 602 may determine a starting point based on an anatomical structure of the subject. For example, the starting point determination unit 602 may determine a rib pixel/voxel close to a vertebra as a starting point of the rib. The rib pixel/voxel close to the vertebra may indicate that the rib pixel/voxel may be within a certain range (e.g., 10 millimeters, 20 millimeters, 30 millimeters, etc.) of the vertebra. In some embodiments, the starting point determination unit 602 may determine a rib pixel/voxel at the lowest position in the anatomical structure of the rib (i.e., a rib pixel/voxel closest to the back of the subject) as a starting point of the rib. For example, rib pixels/voxels (e.g., rib pixels/voxels of one or more image layers in a coronal plane) may be added up (or superimposed) along an anterior-posterior direction (see FIG. 7C) of the subject (e.g., a direction from the front to the back of the subject) to obtain a diagram representing the total number of rib pixels/voxels in each coronal plane. In some embodiments, each element at a position of the diagram may represent a total number of pixels/voxels. The pixels/voxels may be located at a corresponding position in one or more of the image layers and may belong to a portion of the rib pixels/voxels, wherein each pixel/voxel of the portion of the rib pixels/voxels may have a gray value larger than a threshold. Then the rib pixels/voxels in the diagram may be added up (or superimposed) along a superior-inferior direction of the subject (e.g., a direction from the head to the feet of the subject) to obtain a histogram representing a distribution of rib pixels/voxels along a left-right direction of the subject (e.g., a direction from the left hand to the right hand of the subject). In some embodiments, each element of the histogram may represent a sum of elements of the diagram that have a same position in a left-right direction in the diagram. A position in the histogram with a minimum value may be determined as a coordinate on an X axis of the lowest position, wherein the X axis may correspond to a sagittal axis of the subject. A sagittal Y-Z plane relating to the coordinate on the X axis may be determined, wherein the Y-Z plane may correspond to a coronal plane of the subject. The starting point may be determined based on an intersection part of the Y-Z plane and a pre-segmentation result (e.g., a pre-segmented rib). As illustrated in FIG. 7C, a rib pixel/voxel closest to the back of the subject (e.g., the rib pixel/voxel indicated by the arrow S in a first segment 752 of a rib) may be designated as the starting point. In some embodiments, one rib may have one or more starting points.

The partial rib segmentation unit 604 may determine a first portion of a rib using a segmentation algorithm based on a starting point determined by the starting point determination unit 602. In some embodiments, the partial rib segmentation unit 604 may start rib segmentation from the starting point. In an anatomical structure, a rib may have two ends, a first end and a second end. In some embodiments, the first end may be far from the vertebra, while the second end may be connected or close to a vertebra. In some embodiments, the first end may be spaced from the vertebra by a first distance, while the second end may be spaced from the vertebra by a second distance, and the first distance is larger than the second distance. A cross plane passing through the starting point may divide the rib into two portions. In some embodiments, the cross plane may refer to a plane perpendicular to a tangential direction of an outer surface of the rib at the starting point. In some embodiments, the starting point may be closer to the second end than to the first end of the rib. The first portion of the rib may refer to a rib segment between the starting point to the first end, while the second portion of the rib may refer to a rib segment between the starting point to the second end. The partial rib segmentation unit 604 may determine the first portion of the rib based on one or more segmentation algorithms mentioned in the present disclosure.

The rib model tracking unit 606 may determine the second portion of the rib using model tracking based on the starting point. The rib model tracking unit 606 may include one or more sub-units as described in FIG. 7A. In some embodiments, the rib model tracking unit 606 may start rib model tracking from the starting point. In some embodiments, the rib model tracking unit 606 may determine the second portion of the rib using an artificial intelligence based model tracking algorithm. The artificial intelligence algorithm may train a plurality of images relating to at least one sample rib and generate a classifier for recognizing a rib.

The rib boundary extraction unit 608 may extract a boundary of the rib. In some embodiments, the rib boundary extraction unit 608 may extract the rib boundary based on the first portion of the rib determined by the partial rib segmentation unit 604 and/or the second portion of the rib determined by the rib model tracking unit 606. In some embodiments, the rib boundary extraction unit 608 may generate a whole rib based on the first portion of the rib and the second portion of the rib, and then extract the boundary based on the whole rib. In some embodiments, one or more pixels/voxels of the first portion may overlap with one or more pixels/voxels of the second portion near the starting point. Thus, the rib boundary extraction unit 608 may fuse the intertwined pixel(s)/voxel(s) and generate the whole rib. The rib boundary extraction unit 608 may extract the rib boundary using one or more algorithms including, for example, a Roberts edge detection algorithm, a Sobel edge detection algorithm, a Prewitt edge detection algorithm, a Laplacian edge detection algorithm, a Log edge detection algorithm, a Canny edge detection algorithm, an algorithm based on a facet model, or the like, or any combination thereof. In some embodiments, the rib boundary extraction unit 608 may obtain a segmented rib by segmenting at least one portion of a target rib.

It should be noted that the above description of the rib segmentation sub-module 506 is merely provided for the purpose of illustration, and not intended to limit the scope of the present disclosure. For persons having ordinary skills in the art, multiple variations and/or modifications may be made to the rib segmentation sub-module 506 under the teachings of the present disclosure. However, those variations and modifications do not depart from the scope of the present disclosure. For example, the partial rib segmentation unit 604 may be removed. As another example, the entire rib may be segmented by the rib model tracking unit 606.

Figure 6B:
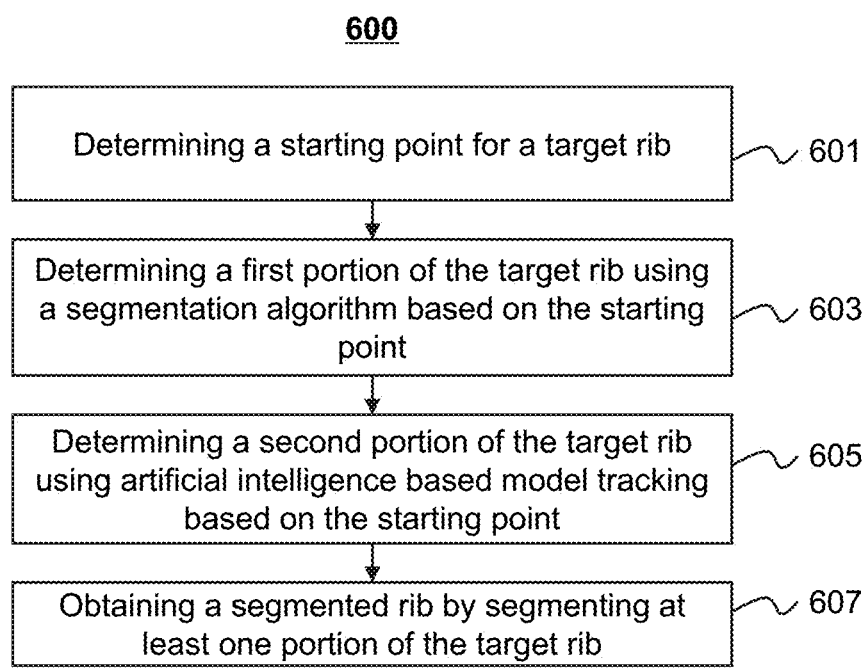
FIG. 6B is a flowchart illustrating an exemplary process for segmenting a rib according to some embodiments of the present disclosure.

FIG. 6B is a flowchart illustrating an exemplary process 600 for segmenting a rib according to some embodiments of the present disclosure. In some embodiments, the process 600 may be performed by the rib segmentation sub-module

506. At least a portion of the process 600 may be implemented on a computing device as illustrated in FIG. 2 or a mobile device as illustrated in FIG. 3.

In 601, a starting point for a target rib may be determined. In some embodiments, operation 601 may be performed by the starting point determination unit 602. In some embodiments, a point of the target rib closer to the second end than to the first end of the target rib may be designated as the starting point. In some embodiments, the starting point may be determined randomly based on one or more rib pixels/voxels. For instance, among a plurality of rib pixels/voxels of a rib to be segmented, a rib pixel/voxel may be designated as a starting point. As another example, among a plurality of rib pixels/voxels of a rib to be segmented, two or more neighboring rib pixels/voxels may be designated as a starting point. As used herein, a pair of pixels/voxels may be referred to as neighboring pixels/voxels if there is no other pixel/voxel located between the pair of pixels/voxels; one of the pair may be referred to as a neighboring pixel/voxel of the other. As used herein, a plurality of pixels/voxels may be referred to as neighboring pixels/voxels if each pixel/voxel of the plurality of pixels/voxels has a neighboring pixel/voxel that is also one of the plurality of pixels/voxels.

In some embodiments, the starting point may be determined based on a threshold. For example, a rib pixel/voxel having a CT value greater than the threshold may be determined as the starting point. In some embodiments, the starting point may be determined based on an anatomical structure of the subject. For example, a rib pixel/voxel close to a vertebra may be determined as the starting point. That a rib pixel/voxel is considered close to the vertebra if the rib pixel/voxel is within a certain range (e.g., 10 millimeters, 20 millimeters, 30 millimeters, etc.) of the vertebra. In some embodiments, a rib pixel/voxel at the lowest position in the anatomical structure of the rib (i.e., a rib pixel/voxel closest to the back of the subject) may be designated as a starting point of the rib. For example, rib pixels/voxels (e.g., rib pixels/voxels of one or more image layers in a coronal plane) may be added up (or superimposed) along an anterior-posterior direction (see FIG. 7C) of the subject (e.g., a direction from the front to the back of the subject) to obtain a diagram representing the total number of rib pixels/voxels in each coronal plane. In some embodiments, each element at a position of the diagram may represent a total number of pixels/voxels. The pixels/voxels may be located at a corresponding position in one or more of the image layers and may belong to a portion of the rib pixels/voxels, wherein each pixel/voxel of the portion of the rib pixels/voxels may have a gray value larger than a threshold. Then the rib pixels/voxels in the diagram may be added up (or superimposed) along a superior-inferior direction of the subject (e.g., a direction from the head to the feet of the subject) to obtain a histogram representing a distribution of rib pixels/voxels along a left-right direction of the subject (e.g., a direction from the left hand to the right hand of the subject). In some embodiments, each element of the histogram may represent a sum of elements of the diagram that have a same position in a left-right direction in the diagram. A position in the histogram with a minimum value may be determined as a coordinate on an X axis of the lowest position, wherein the X axis may correspond to a sagittal axis of the subject. A sagittal Y-Z plane relating to the coordinate on the X axis may be determined, wherein the Y-Z plane may correspond to a coronal plane of the subject. The starting point may be determined based on an intersection part of the Y-Z plane and a pre-segmentation result (e.g., a pre-segmented rib). As illustrated in FIG. 7C, a rib pixel/voxel closest to the back of the subject (e.g., the rib pixel/voxel indicated by the arrow S in a first segment 752 of a rib) may be designated as the starting point. In some embodiments, one rib may have one or more starting points. Operation 601 may be performed automatically, semi-automatically, or manually. For example, the starting point may be automatically determined as described above. As another example, a user may determine the starting point manually through the I/O 230. As still another example, the user may modify, add, delete, or adjust the automatically determined starting point.

In 603, a first portion of the target rib may be determined using a segmentation algorithm based on the starting point determined in 601. In some embodiments, operation 603 may be performed by the partial rib segmentation unit 604. Considering that the first portion of the target rib is not adhesive to any vertebra, a convenient algorithm (e.g., a threshold segmentation, a region growing segmentation, etc.) may be involved in 603. The convenient algorithm may have a relatively high efficiency, and consume less computational capacity and/or time. In some embodiments, a region growing segmentation may be performed to segment the first portion of the target rib. Using region growing segmentation, pixel(s)/voxel(s) that are adjacent to the starting point and satisfy one or more conditions may be iteratively extracted as rib pixels/voxels. One or more limitations may be set for segmenting the first portion of the target rib when the region growing algorithm is involved. In some embodiments, the region growing may be performed along a direction from the starting point to the first end of the target rib, and a newly grown region corresponding to the target rib may be limited not to go beyond the cross plane passing through the starting point that separates the first portion and the second portion of the target rib. In some embodiments, image data corresponding to the rib segmented using region growing may need to satisfy a condition. For example, such image data may satisfy a certain derivative (e.g., a second derivative) relationship, fall within a threshold range, or the like, or any combination thereof.

In 605, a second portion of the target rib may be determined using model tracking based on the starting point determined in 601. In some embodiments, operation 605 may be performed by the rib model tracking unit 606. The second portion of the target rib may be determined using artificial intelligence based model tracking. In some embodiments, the second portion of the target rib may be tracked from the starting point to the second end of the target rib. An exemplary process for rib segmentation using artificial intelligence based model tracking is illustrated in FIG. 7B. One or more rib models may be used in model tracking. The rib model(s) may include a 3D geometry. The 3D geometry may have various shapes including, for example, a cylinder, a cylindroid, a cone, or the like, or any combination thereof. The 3D geometry may have one or more parameters regarding the size of the 3D geometry. For a cylindrical model, the parameters may include a radius r, a height $h_1$, etc. For a cylindroid model, the parameters may include a semi-major axis a, a semi-minor axis b, a height $h_2$, etc. In some embodiments, one or more of the parameters may be adjusted automatically or manually during the rib model tracking process.

In 607, a segmented rib may be obtained by segmenting at least one portion of the target rib. In some embodiments, operation 607 may be performed by the rib boundary extraction unit 608. In some embodiments, the boundary of the target rib may be extracted based on one or more algorithms including, for example, a Roberts edge detection algorithm, a Sobel edge detection algorithm, a Prewitt edge detection algorithm, a Laplacian edge detection algorithm, a Log edge detection algorithm, a Canny edge detection algorithm, an algorithm based on facet model, or the like, or any combination thereof. In some embodiments, the first portion of the target rib and the second portion of the target rib may be combined to obtain the target rib.

It should be noted that the above description of the process 600 is merely provided for the purpose of illustration, and not intended to limit the scope of the present disclosure. For persons having ordinary skills in the art, multiple variations and modifications may be made to the process 600 under the teachings of the present disclosure. However, those variations and modifications do not depart from the scope of the present disclosure. For example, operation 603 may be omitted. As another example, the entire rib (e.g., the first portion and the second portion of the rib) may be segmented using artificial intelligence based model tracking. As still another example, an operation for determining a rib region containing at least a portion of a plurality of ribs may be added before 601. In some embodiments, the rib region may be determined by the rib pre-segmentation sub-module 504. As a further example, an operation for selecting at least one rib of the plurality of ribs as the target rib to be segmented may be added before 601. As still a further example, one or more classification-probability-maps may be generated, and the starting point may be determined based on the classification-probability-map(s). In some embodiments, process 600 for segmenting a rib may be modified as follows: image data may be acquired, wherein the image data may include a plurality of ribs; a rib region containing at least a portion of the plurality of ribs may be determined; at least one rib of the plurality of ribs may be selected as a target rib based on the rib region; at least one rib-probability-map relating to the target rib may be generated based on an artificial intelligence algorithm; a starting point of the target rib may be determined based on the image data, wherein the starting point may indicate a starting position for tracking the target rib; at least one portion of the target rib may be tracked based on the starting point and the at least one rib-probability-map; a segmented rib may be obtained by segmenting the at least one portion of the target rib. In some embodiments, "rib-probability-map" and "classification-probability-map" may be used interchangeably.

Figure 7A:
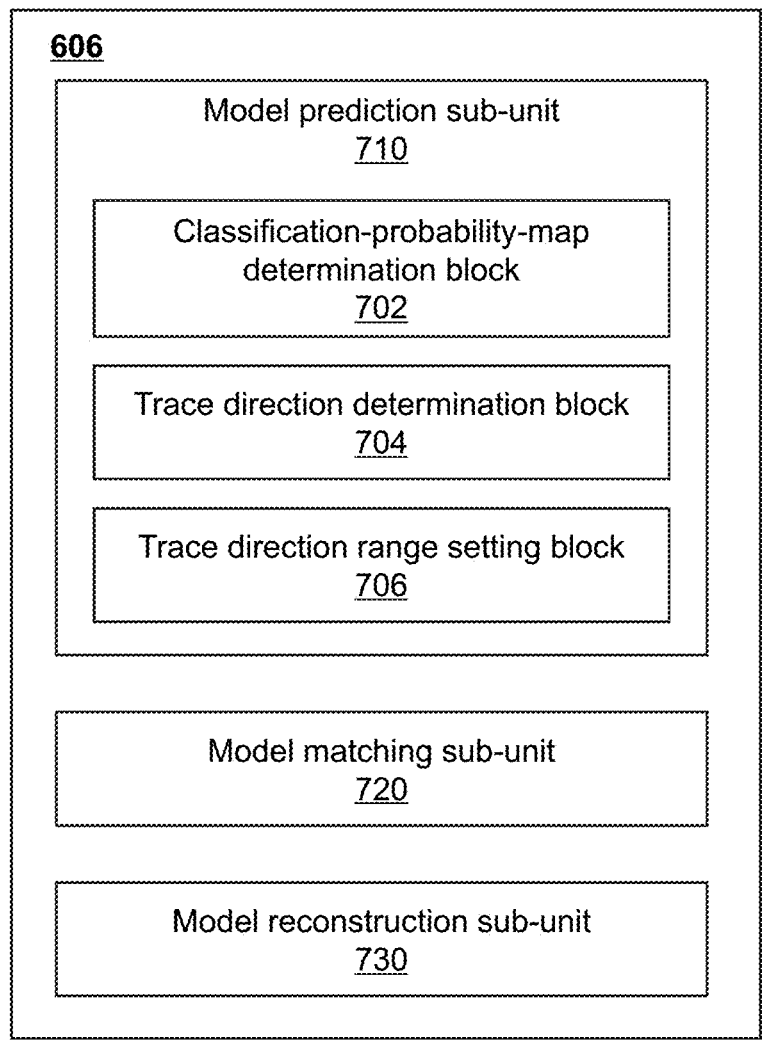
FIG. 7A is a schematic diagram illustrating an exemplary rib model tracking unit according to some embodiments of the present disclosure.

FIG. 7A is a schematic diagram illustrating an exemplary rib model tracking unit 606 according to some embodiments of the present disclosure. The rib model tracking unit 606 may include a model prediction sub-unit 710, a model matching sub-unit 720, and a model reconstruction sub-unit 730. At least a portion of the rib model tracking unit 606 may be implemented on a computing device as illustrated in FIG. 2 or a mobile device as illustrated in FIG. 3.

The model prediction sub-unit 710 may predict one or more features of a rib segment, including, for example, the shape, size, and/or direction, etc. In some embodiments, the model prediction sub-unit 710 may predict the rib segment based on a matching of a rib model (e.g., a rib model as described in FIG. 6B) with the image data. The model prediction sub-unit 710 may predict the rib segment based on a starting point determined by the starting point determination unit 602, or a pixel/voxel of a segmented rib. The rib segment may include one or more pixels/voxels representing a portion of the rib. In some embodiments, the rib segment may have the same shape and/or size as the rib model described in FIG. 6B. The model prediction sub-unit 710 may include a classification-probability-map determination block 702, a trace direction determination block 704, and a trace direction range setting block 706.

The classification-probability-map determination block 702 may generate a classification-probability-map. The classification-probability-map (also referred to as rib-probability-map) may include a plurality of pixels/voxels. In the present disclosure, "classification-probability-map" and "rib-probability-map" are used interchangeably. The classification probability map may have the same size as an image corresponding to the image data acquired in 401. A pixel/voxel in the classification probability map may correspond to a pixel/voxel in the image. A pixel/voxel value of the image may be a gray level, CT value, etc., of a pixel/voxel in the image. A pixel/voxel value of the classification probability map may be a classification probability of a pixel/voxel in the classification probability map. The classification may refer to the identification of which kind of bone, organ, or tissue a pixel/voxel belongs to. The classification probability may refer to a probability that a pixel/voxel belongs to a kind of bone, organ, or tissue.

The classification-probability-map determination block 702 may generate the classification probability map based on an artificial intelligence algorithm. The classification-probability-map determination block 702 may generate the classification probability map based on a trained classifier. A classifier may refer to an artificial intelligence algorithm that implements classification. For example, a classifier may include a classification algorithm to determine whether a pixel/voxel belongs to a rib. In some embodiments, the classifier may be trained with a plurality of samples, including positive samples and/or negative samples. In some embodiments, image data related to rib(s) may be used as positive samples, while image data related to other bones (e.g., a vertebra, a sternum, a scapula, a clavicle, etc.) and/or organs (e.g., a lung, a liver, etc.) may be used as negative samples. It should be noted that the samples used to train the classifier may unnecessarily be part of the image data acquired in 401. The samples may include image data of a plurality of subjects other than the subject described in FIG. 4B. The samples may be obtained from the storage device 150, the storage 220, the storage 390, and/or an external database (not shown). The trained classifier may be generated before rib segmentation. The trained classifier may be stored in the storage device 150, the storage 220, the storage 390, and/or an external database (not shown) for later use.

Using the trained classifier, a rib pixel/voxel in the image data may be assigned a relatively high probability value, while a non-rib pixel/voxel in the image data may be assigned a relatively low probability value. In some embodiments, a high probability value may be relative to the low probability value. For example, a probability value greater than a threshold (e.g., 50%, 60%, 70%, 80%, 90%, etc.) may be regarded as a high probability value, while a probability value lower than the threshold may be regarded as a low probability value. In some embodiments, pixels/voxels with high probability may have a high gray value (or a high brightness) than that with low probability, as shown in FIG. 7E. FIG. 7D is an original rib image. FIG. 7E is a classification probability map obtained based on the original rib image in FIG. 7D and a trained classifier. As illustrated in FIG. 7E, the pixel/voxel A may be assigned a high probability value, while the pixel/voxel B may be assigned a low probability value, which means the pixel/voxel A, but not the pixel/voxel B, may belong to a rib. The classification probability map may enhance the contrast between a rib region and a non-rib region, and thus the accuracy and robustness of the rib model tracking may be improved.

The trace direction determination block 704 may determine a trace direction. There are a plurality of directions in a 2D/3D space. The trace direction may refer to a direction for model tracking. The trace direction may be a direction from an already determined rib pixel/voxel (e.g., a starting point, a rib pixel/voxel determined by the partial rib segmentation unit 604 and/or the rib model tracking unit 606, etc.) to another rib pixel/voxel to be determined. The trace direction determination block 704 may determine the trace direction based on the classification probability map. In some embodiments, the trace direction determination block 704 may designate a direction along which a pixel/voxel with a highest probability at a pixel/voxel in the classification probability map that corresponds to the already determined rib pixel/voxel as the trace direction.

The trace direction range setting block 706 may set a trace direction range. The trace direction range may refer to a range of trace directions in the 2D/3D space along which the model tracking may be performed. In some embodiments, the model tracking may be performed along any trace direction in the 2D/3D space. In some embodiments, the model tracking may be performed within the trace direction range, and no model tracking may be performed outside the trace direction range, thereby saving a tracking time. The trace direction range setting block 706 may set the trace direction range based on characteristic information of the rib. The characteristic information may include an anatomical structure of the rib, a position of the rib relative to another bone and/or another tissue, a curvature of a pixel/voxel of the rib, or the like, or any combination thereof. In some embodiments, the trace direction range setting block 706 may generate a classification probability map within the trace direction range.

The model matching sub-unit 720 may perform model matching based on the predicted rib segment. The model matching sub-unit 720 may determine whether the predicted rib segment belongs to the rib. The model matching sub-unit 720 may compare the predicted rib segment with a rib model. More descriptions of the rib model may be found elsewhere in the present disclosure. See, for example, FIG. 6B and the description thereof. In some embodiments, the model matching sub-unit 720 may perform model matching based on a characteristic value of pixels/voxels in the predicted rib segment. The characteristic value may include an average value of pixels/voxels in the predicted rib segment, a minimum value of pixels/voxels in the predicted rib segment, an average value of pixels/voxels at a boundary of the predicted rib segment, a minimum value of pixels/voxels at a boundary of the predicted rib segment, or the like, or any combination thereof. For example, an average value of pixels/voxels in the predicted rib segment may be determined and compared with a threshold value determined based on the rib model. If the comparison result satisfies a condition (e.g., the average value is greater than the threshold value), the model matching sub-unit 720 may determine that the model matching is successful, and accordingly the predicted rib segment may be determined to belong to the rib. Otherwise, the model matching sub-unit 720 may determine that the predicted rib segment does not belong to the rib.

In some embodiments, the model matching sub-unit 720 may determine when to terminate the model tracking based on a result of the model matching. For example, if the model matching sub-unit 720 determines that the predicted rib segment does not belong to the rib, the model matching sub-unit 720 may determine that the model tracking reaches an end of the rib. Thus, the model tracking may be terminated.

The model reconstruction sub-unit 730 may perform model reconstruction based on one or more rib segments successfully matched by the model matching sub-unit 720. In some embodiments, the model reconstruction sub-unit 730 may generate a whole rib based on the matched rib segments. In some embodiments, the model reconstruction sub-unit 730 may modify, adjust, and/or update the rib model based on the matched rib segments. For example, the model reconstruction sub-unit 730 may adjust the dimension(s) of the rib model based on an average size of the matched rib segments.

It should be noted that the above description of the rib model tracking unit 606 is merely provided for the purpose of illustration, and not intended to limit the scope of the present disclosure. For persons having ordinary skills in the art, multiple variations and/or modifications may be made to the rib model tracking unit 606 under the teachings of the present disclosure. However, those variations and modifications do not depart from the scope of the present disclosure. For example, the trace direction range setting block 706 may be removed. As another example, the model prediction sub-unit 710 and the model matching sub-unit 720 may be integrated into one sub-unit.

FIG. 7B is a flowchart illustrating an exemplary process 700 for rib model tracking according to some embodiments of the present disclosure. In some embodiments, the process 700 may be performed by the rib model tracking unit 606. At least a portion of the process 700 may be implemented on a computing device as illustrated in FIG. 2 or a mobile device as illustrated in FIG. 3.

In 701, a trace direction range may be determined based on the image data. In some embodiments, operation 701 may be performed by the trace direction range setting block 706. The trace direction range may be determined based on characteristic information of the rib. In some embodiments, the characteristic information may be acquired based on prior knowledge. The characteristic information may include an anatomical structure of the rib, a position of the rib relative to another bone and/or another tissue, a curvature of a pixel/voxel of the rib, or the like, or any combination thereof.

In 703, a classification probability map may be generated within the trace direction range. In some embodiments, operation 703 may be performed by the classification-probability-map determination block 702. The classification probability map may be generated based on a trained classifier. Using the trained classifier, a rib pixel/voxel in the image data may be assigned a relatively high probability value, while a non-rib pixel/voxel in the image data may be assigned a relatively low probability value. In some embodiments, a high probability value may be relative to the low probability value. For example, a probability value greater than a threshold (e.g., 50%, 60%, 70%, 80%, 90%, etc.) may be regarded as a high probability value, while a probability value lower than the threshold may be regarded as a low probability value. In some embodiments, pixels/voxels with high probability may have a high gray value (or a high brightness) than that with low probability. The classification probability map may enhance the contrast between a rib region and a non-rib region, and thus the accuracy and robustness of the rib model tracking may be improved.

In 705, a trace direction may be determined based on the classification probability map generated in 703 to obtain a predicted rib segment. In some embodiments, operation 705 may be performed by the trace direction determination block 704. In some embodiments, a direction along which a pixel/voxel with a highest probability at a pixel/voxel in the classification probability map that corresponds to the already determined rib pixel/voxel may be determined as the trace direction. A rib segment may be predicted based on the trace direction and a rib model as described in FIG. 6B.

In 707, the predicted rib segment obtained in 705 may be matched with one or more rib models. In some embodiments, operation 707 may be performed by the model matching sub-unit 720. A determination as to whether the predicted rib segment belongs to the rib may be made in 707. The predicted rib segment may be compared with one or more rib models. More descriptions of the rib model may be found elsewhere in the present disclosure. See, for example, FIG. 6B and the description thereof. In some embodiments, the model matching may be performed based on a characteristic value of pixels/voxels in the predicted rib segment. The characteristic value may include an average value of pixels/voxels in the predicted rib segment, a minimum value of pixels/voxels in the predicted rib segment, an average value of pixels/voxels at a boundary of the predicted rib segment, a minimum value of pixels/voxels at a boundary of the predicted rib segment, or the like, or any combination thereof. For example, an average value of pixels/voxels in the predicted rib segment may be determined and compared with a threshold value determined based on the rib model. In some embodiments, the characteristic value may be determined based on one or more classification-probability-maps. If the comparison result satisfies a condition (e.g., the average value is greater than the threshold value), the model matching may be determined to be successful, and accordingly the predicted rib segment may be determined to belong to the rib. Otherwise, the predicted rib segment may be determined to not belong to the rib. In some embodiments, the rib model may be adjusted in the model matching process. For example, the size of the rib model may be adjusted in the model matching process. In some embodiments, the predicted rib segment may be adjusted in the model matching process. For example, the orientation, position, size, etc. of the predicted rib segment may be adjusted in a certain range, and a new predicted rib segment may be generated. In some embodiments, the adjusted predicted rib segment may have an improved characteristic value, and may be regarded as a matched rib segment.

In 709, model reconstruction may be performed to obtain a reconstructed model. In some embodiments, operation 709 may be performed by the model reconstruction sub-unit 730. In some embodiments, model reconstruction may be performed based on one or more matched rib segments determined in 707. In some embodiments, the rib model may be modified, adjusted, and/or updated based on the matched rib segments. For example, the dimension(s) of the rib model may be adjusted based on an average size of the matched rib segments. In some embodiments, a target rib may be generated based on the matched rib segments.

In some embodiments, based on a determination that the predicted rib segment obtained in 705 does not match with the rib model(s), model reconstruction may be performed in 709 to obtain a reconstructed model, and a plurality of iterations may be performed to obtain the target rib. In some embodiments, based on a determination that the predicted rib segment obtained in 705 does not match with the rib model(s), the tracking of the target rib may be terminated. In some embodiments, based on a determination that the predicted rib segment obtained in 705 matches with the rib model(s), the predicted rib segment may be designated as a matched portion of the target rib, and a next portion of the target rib may be tracked based on the matched portion of the target rib and the classification-probability-map (also referred to as rib-probability-map).

FIG. 7C illustrates an exemplary trace direction range of rib model tracking according to some embodiments of the present disclosure. As shown in FIG. 7C, a rib may have a plurality of segments (e.g., a first segment 752, a second segment 753, a third segment 754, etc.). The rib may be adhesive to a vertebra 755. Taking into consideration of an anatomical structure of the rib and the vertebra 755, the trace direction range may have a maximum anterior direction $D_1$, and a maximum posterior direction $D_2$.

FIG. 7D illustrates an exemplary original rib image according to some embodiments of the present disclosure.

FIG. 7E illustrates an exemplary classification probability map according to some embodiments of the present disclosure. The classification probability map was acquired by processing the original rib image with a trained classifier. The rib pixel/voxel A may have a relatively higher probability, while the vertebra pixel/voxel B may have a relatively lower probability.

Figure 8:
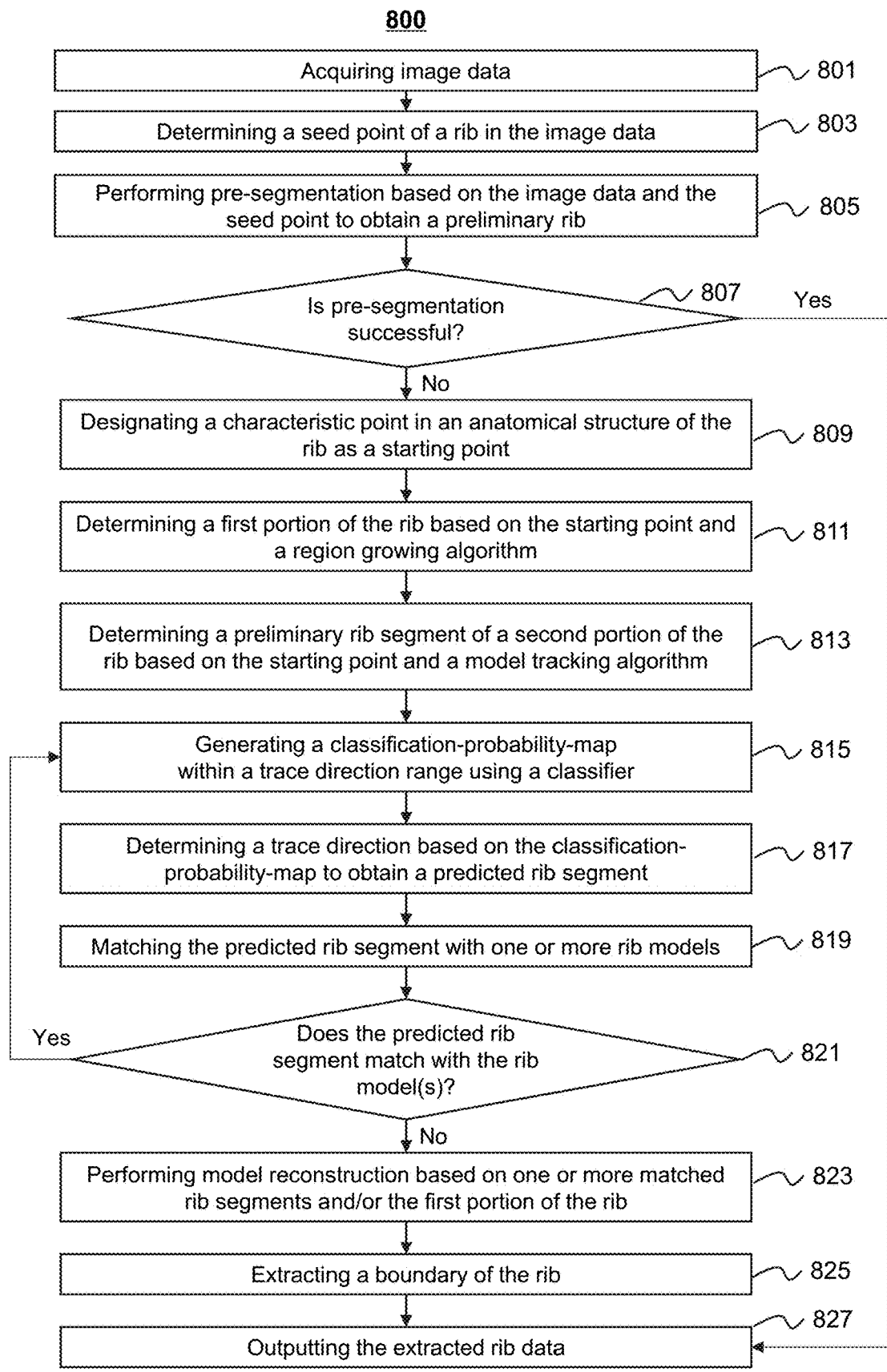
FIG. 8 is a flowchart illustrating an exemplary process for extracting a rib according to some embodiments of the present disclosure.

FIG. 8 is a flowchart illustrating an exemplary process 800 for extracting a rib according to some embodiments of the present disclosure. At least a portion of the process 800 may be implemented on a computing device as illustrated in FIG. 2 or a mobile device as illustrated in FIG. 3.

In 801, image data may be acquired. The image data may include one or more ribs. The image data may be acquired as described in 401.

In 803, a seed point of a rib may be determined in the image data. The seed point of the rib may be determined based on the position of an organ (e.g., a lung, a liver, etc.). The seed point may be determined as described in 501.

In 805, pre-segmentation may be performed based on the image data and the seed point determined in 803 to obtain a preliminary rib. The rib may be pre-segmented using an edge detection algorithm based on a Laplace operator.

In 807, a determination as to whether the rib pre-segmentation is considered successful may be made. The determination may be made based on position information of the rib pre-segmented in 805 and another bone (e.g., a vertebra, etc.). In some embodiments, one or more image layers of the pre-segmented rib in a coronal plane may be superimposed to generate a grayscale superposition image. A pixel/voxel value of a pixel/voxel in the grayscale superposition image may be a sum of pixel/voxel values of pixels/voxels in a same position in the image layers. In some embodiments, a spatial range of a vertebra may be determined based on a region of highest gray values in the grayscale superposition image. A spatial range of the rib pre-segmented in 805 may be compared with the spatial range of the vertebra. In some embodiments, in response to the determination that the spatial range of the rib at least partially overlaps within the spatial range of the vertebra, the pre-segmented rib may be determined to be adhesive to a vertebra. Thus, the pre-segmentation of the rib may be determined to be unsuccessful (e.g., "No" in operation 807), and the process 800 may proceed to 809 to perform a further segmentation for the rib. In some embodiments, in response to the determination that no part of the spatial range of the rib is within the coordinate range of the vertebra, the pre-segmentation of the rib may be determined to be successful (e.g., "Yes" in operation 807), and the process 800 may proceed to operation 827 to output the extracted rib data.

It should be noted that in some embodiments, the preliminary rib may be designated as a target rib for further segmentation based on a determination that the preliminary rib is adhesive to a vertebra. In some embodiments, the preliminary rib may be designated as a segmented rib based on a determination that the preliminary rib is not adhesive to a vertebra. Operations 809 through 825 may be a further segmentation for a target rib that is not successfully pre-segmented in 805.

In 809, a characteristic point in an anatomical structure of the rib may be designated as a starting point. In some embodiments, the characteristic point may be a low point. The low point in an anatomical structure of the rib may be a point that is determined to be nearest to the back of a subject. A threshold algorithm may be employed to extract one or more bones (e.g., ribs, vertebrae, sternum, etc.) in the image data. Pixels/voxels may be superimposed in a coronal plane, and a position with a minimum number of pixels/voxels may be determined as the low point in the anatomical structure of the rib. In some embodiments, the low point may be determined based on a curvature value of the rib pixels/voxels. For example, a point with a maximum curvature of the rib may be determined as the low point. In some embodiments, a rib pixel/voxel at the lowest position in the anatomical structure of the rib (i.e., a rib pixel/voxel closest to the back of the subject) may be designated as a starting point of the rib. For example, rib pixels/voxels (e.g., rib pixels/voxels of one or more image layers in a coronal plane) may be added up (or superimposed) along an anterior-posterior direction (see FIG. 7C) of the subject (e.g., a direction from the front to the back of the subject) to obtain a diagram representing the total number of rib pixels/voxels in each coronal plane. In some embodiments, each element at a position of the diagram may represent a total number of pixels/voxels. The pixels/voxels may be located at a corresponding position in one or more of the image layers and may belong to a portion of the rib pixels/voxels, wherein each pixel/voxel of the portion of the rib pixels/voxels may have a gray value larger than a threshold. Then the rib pixels/voxels (or elements) in the diagram may be added up (or superimposed) along a superior-inferior direction of the subject (e.g., a direction from the head to the feet of the subject) to obtain a histogram representing a distribution of rib pixels/voxels along a left-right direction of the subject (e.g., a direction from the left hand to the right hand of the subject). In some embodiments, each element of the histogram may represent a sum of elements belonging to a portion of all the elements of the diagram, wherein the portion of all the elements may have a same position in a left-right direction in the diagram. In some embodiments, the characteristic point may be determined based on a position in the histogram. A position in the histogram with a minimum value may be determined as a coordinate on an X axis of the lowest position, wherein the X axis may correspond to a sagittal axis of the subject. A sagittal Y-Z plane relating to the coordinate on the X axis may be determined, wherein the Y-Z plane may correspond to a coronal plane of the subject. The starting point may be determined based on an intersection part of the Y-Z plane and a pre-segmentation result (e.g., a pre-segmented rib).

In 811, a first portion of the rib may be determined based on the starting point determined in 809. In an anatomical structure, a rib may have two ends, a first end and a second end. In some embodiments, the first end may be far from the vertebra, while the second end may be connected or close to a vertebra. In some embodiments, the first end may be spaced from the vertebra by a first distance, while the second end may be spaced from the vertebra by a second distance, and the first distance is larger than the second distance. A cross plane passing through the starting point may divide the rib into two portions. In some embodiments, the cross plane may refer to a plane perpendicular to a tangential direction of an outer surface of the rib at the starting point. In some embodiments, the starting point may be closer to the second end than to the first end of the rib. The first portion of the rib may refer to a rib segment between the starting point to the first end, while the second portion of the rib may refer to a rib segment between the starting point to the second end. A region growing algorithm may be employed to segment the first portion of the rib. Using region growing segmentation, pixel(s)/voxel(s) that are adjacent to the starting point and satisfy one or more conditions may be iteratively extracted as rib pixels/voxels. One or more limitations may be set for segmenting the first portion of the rib when the region growing algorithm is involved. In some embodiments, the region growing may be performed along a direction from the starting point to the second end of the rib, and a newly grown region corresponding to the rib may be limited not to go beyond the cross plane passing through the starting point that separates the first portion and the second portion of the rib. In some embodiments, image data corresponding to the rib segmented using region growing may need to satisfy a condition. For example, such image data may satisfy a certain derivative (e.g., a second derivative) relationship, fall within a threshold range, or the like, or any combination thereof.

Operations 813 through 819 may be performed to determine a second portion of the rib.

In 813, a preliminary rib segment of a second portion of the rib may be determined in the image data based on the starting point determined in 809 and/or a model tracking algorithm. The image data may be processed with a trained classifier to generate a classification probability map. A plurality of directions at the starting point may be searched and the direction along which a pixel/voxel with a highest probability at a pixel/voxel in the classification probability map that corresponds to the already determined rib pixel/voxel may be designated as a preliminary trace direction. The preliminary rib segment of the second portion of the rib may be determined using model tracking along the preliminary trace direction. The preliminary rib segment may be matched with a rib model, as described in 707. More descriptions of the rib model may be found elsewhere in the present disclosure. See, for example, FIG. 6B and the description thereof. If the preliminary rib segment is considered matched successfully with the rib model, the preliminary rib segment may be designated as a real rib segment (or a matched rib segment).

In 815, a classification probability map within a preset trace direction range may be generated using a classifier. In some embodiments, the classification probability map may be generated as described in 703. In some embodiments, a small trace direction range may be set towards the posterior direction, while a large trace direction range may be set towards the anterior direction, since the rib may curve towards the anterior direction to approach a vertebra (as shown in FIG. 7C). In some embodiments, the trace direction range may be illustrated as an angle range. The angle may refer to an intersection angle of a trace direction and a linear extension direction of the preliminary rib. For example, a range of 45 degrees towards the anterior direction and a range of 15 degrees towards the posterior directions may be designated as the trace direction range (e.g., the range between $D_1$ and $D_2$ in FIG. 7C).

In 817, a trace direction may be determined based on the classification probability map to obtain a predicted rib segment. A direction along which a pixel/voxel with a highest probability at a pixel/voxel in the classification probability map generated in 815 that corresponds to the already determined rib pixel/voxel may be designated as the trace direction, and thus a predicted rib segment may be obtained.

In 819, the predicted rib segment obtained in 817 may be matched with one or more rib models. The predicted rib segment may be compared with the rib model(s), as described in 707. More descriptions of the rib model may be found elsewhere in the present disclosure. See, for example, FIG. 6B and the description thereof. The predicted rib segment may have a similar shape and/or size with the rib model. For example, if a cylinder is used as a rib model in model tracking, the predicted rib segment obtained in 817 may have a cylindrical shape. In some embodiments, an average value of pixels/voxels of the rib segment may be determined and compared with a threshold relating to the rib model.

In 821, a determination as to whether the predicted rib segment matches with the model(s) may be made. In some embodiments, if a difference between the predicted rib segment and a preset model (i.e., the rib model) is within a threshold, then the predicted rib segment may be determined to match with the preset model. For example, it may be determined that the predicted rib segment matches with the preset model when a difference between the average value of pixels/voxels in the predicted rib segment and that in the preset model is less than the threshold. As another example, it may be determined that the predicted rib segment does not match with the preset model when the difference between the average value of pixels/voxels in the predicted rib segment and that in the preset model is no less than the threshold. The process 800 may return to 815 in response to the determination that the predicted rib segment matches with the preset model (e.g., "Yes" in operation 821). In some embodiments based on a determination that the predicted rib segment matches with the rib model(s), the predicted rib segment may be designated as a matched rib segment of a target rib, and a next rib segment of the target rib may be tracked based on the matched rib segment of the target rib and/or a reconstructed model. In some embodiments, a plurality of iterations may be performed based on the reconstructed model and/or the matched rib segment of the target rib to obtain a next rib segment of the target rib. The process 800 may proceed to 823 in response to the determination that the predicted rib segment does not match with the preset model.

In 823, model reconstruction may be performed based on one or more matched rib segments determined in 813 through 821 and/or the first portion of the rib determined in 811 to form a rib. In some embodiments, based on a determination that the predicted rib segment does not match with the rib model(s), the tracking of at least one portion of a target rib may be terminated. In some embodiments, based on a determination that the predicted rib segment does not match with the rib model(s), model reconstruction may be performed to obtain a reconstructed model based on one or more matched rib segments. In some embodiments, at least one portion of a target rib may be extracted based on the matched rib segment(s) and/or the reconstructed model.

In 825, a boundary of the rib may be extracted. The boundary of the rib may be extracted based on one or more algorithms mentioned in the present disclosure. See, for example, FIG. 6B and the description thereof.

In 827, the extracted rib data may be outputted. In some embodiments, the extracted rib data may be outputted through the I/O 230 for display. In some embodiments, the extracted rib data may be outputted to a terminal 130. In some embodiments, the extracted rib data may be outputted to a storage (e.g., the storage device 150, the storage 220, the storage 390, etc.) for storing.

It should be noted that the above description about the process 800 for extracting a rib is merely provided for the purpose of illustration, and not intended to limit the scope of the present disclosure. For persons having ordinary skills in the art, multiple variations and/or modifications may be made under the teachings of the present disclosure. However, those variations and modifications do not depart from the scope of the present disclosure. For example, operation 811 may be performed after 813 through 821. It may be indicated that the first portion of the rib may be determined after the second portion of the rib is determined. As another example, operations 813 through 821 may be performed simultaneously with 811. One or more other operations may be added to process 800, or one or more operations may be omitted from process 800. For example, operations 805 through 807 may be omitted. It may be indicated that there may be no pre-segmentation of ribs.

Figure 9:
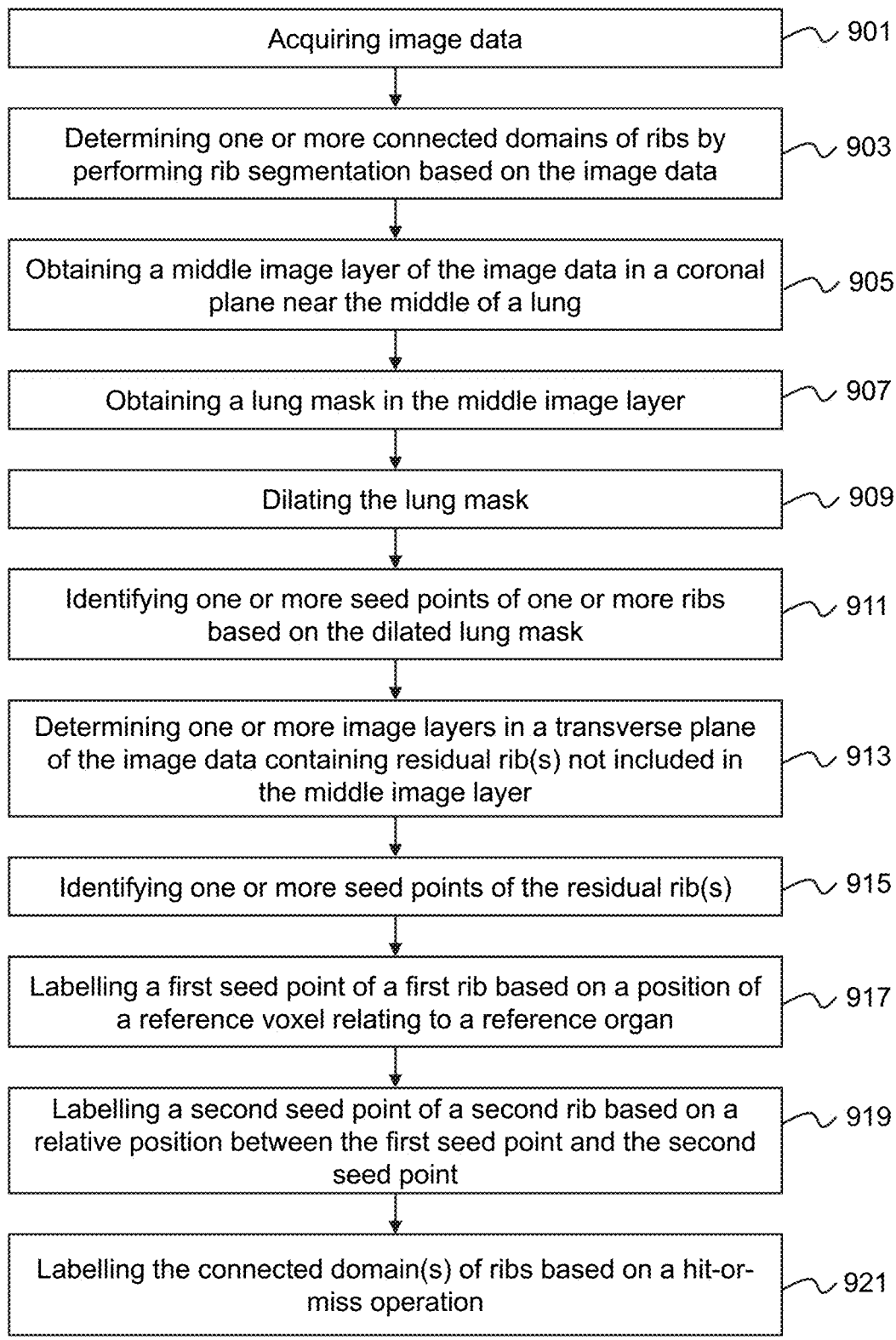
FIG. 9 is a flowchart illustrating an exemplary process for labelling one or more ribs according to some embodiments of the present disclosure.

FIG. 9 is a flowchart illustrating an exemplary process 900 for labelling one or more ribs according to some embodiments of the present disclosure. At least a portion of the process 900 may be implemented on a computing device as illustrated in FIG. 2 or a mobile device as illustrated in FIG. 3.

In 901, image data may be acquired. The image data may be acquired as described in 401. It should be noted that the image data may include a plurality of lung pixels/voxels that correspond to a left lung and/or a right lung. In some embodiments, one or more lung voxels may be referred to as lung volume data.

In 903, one or more connected domains (or regions) of the ribs may be determined by performing rib segmentation based on the image data. One or more ribs may be segmented based on one or more segmentation algorithms mentioned in the present disclosure. The ribs may be segmented as described in the process 500, and/or the process 600. In some embodiments, a rib may have one or more connected domains (or regions). A connected domain (or region) may include one or more neighboring rib pixels/voxels.

In 905, a middle image layer of the image data in a coronal plane near the middle of a lung may be obtained. In some embodiments, an image layer among all image layers in a coronal plane with a greatest number of ribs may be regarded as the middle image layer. In some embodiments, an image layer among all image layers in a coronal plane with a largest area of a left lung and/or a right lung may be regarded as the middle image layer. In some embodiments, an image layer located in the middle layer in a coronal plane may be regarded as the middle image layer. For example, for CT image data with a resolution of 512×512 in a transverse plane, the 256th image layer in a coronal plane may be selected as the middle image layer. In some embodiments, an image layer located near the middle image layer may also be regarded as a middle image layer. In some embodiments, the middle image layer may be adjusted based on an anatomical structure of the ribs and other bones (e.g., a vertebra). For example, if the middle image layer contains any part of a vertebra, another middle image layer in the coronal plane that does not contain any part of a vertebra may be selected among the image layers towards the anterior direction or the posterior direction. For instance, for CT image data with a resolution of 512×512 in a transverse plane, the obtained middle image layer may be one of the 240th to 260th image layers in the coronal plane. As another example, the middle image layer in the coronal plane may contain one to nine (or ten) pairs of ribs, while the residual ribs may not be shown in the middle image layer.

Figure 10A:
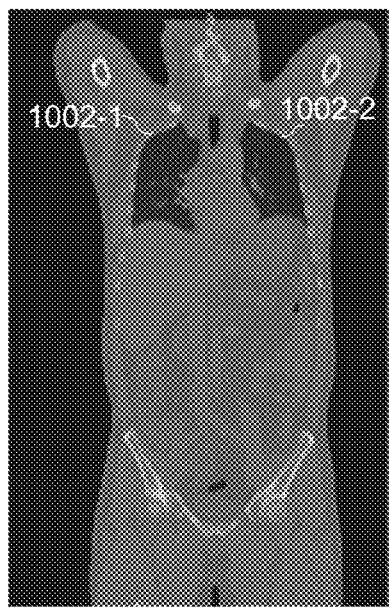
FIG. 10A illustrates an exemplary middle image layer in the coronal plane according to some embodiments of the present disclosure.

In 907, a lung mask in the middle image layer may be obtained. Ribs may have a barrel shape surrounding a left lung and/or a right lung in terms of the anatomical structure. In some embodiments, the lung mask may be obtained based on the middle image layer and one or more segmentation algorithms mentioned in the present disclosure. FIG. 10A illustrates an exemplary middle image layer in the coronal plane obtained in 905. A lung mask 1002-1 for the left lung and a lung mask 1002-2 for the right lung are illustrated in FIG. 10A.

Figure 10B:
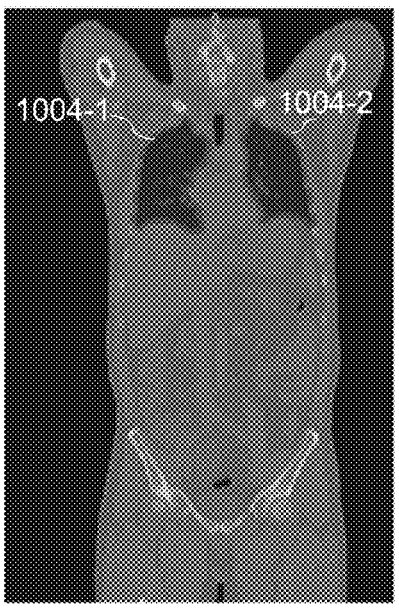
FIG. 10B illustrates an exemplary middle image layer with a dilated lung mask in the coronal plane according to some embodiments of the present disclosure.

In 909, the lung mask may be dilated. A dilating operation may refer to the expansion of a shape of the lung mask based on a structural element. Ribs may be included in the dilated lung mask. One or more parameters may be used in the dilating operation, for example, a lung mask region in the image data to be dilated, a size of the structural element, or the like, or any combination thereof. The parameters may be predetermined based on one or more empirical values. In some embodiments, the extent of the dilation may be determined based on characteristics of the image data including, for example, an image resolution, a characteristic of the subject (e.g., a size of a lung of the subject, etc.), or the like, or any combination thereof. FIG. 10B illustrates an exemplary middle image layer with a dilated lung mask in the coronal plane. A dilated lung mask 1004-1 for the left lung and a dilated lung mask 1004-2 for the right lung are illustrated in FIG. 10B.

Figure 10C:
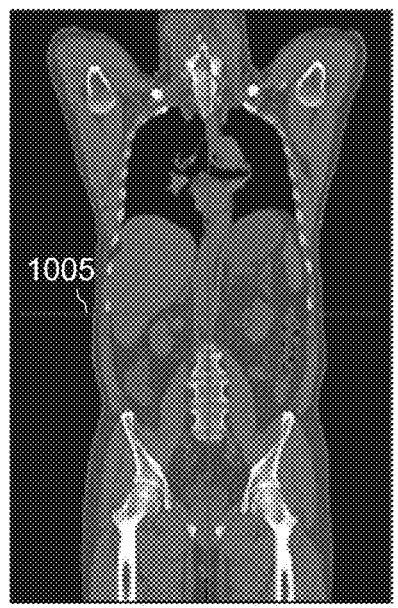
FIG. 10C illustrates an exemplary middle image layer with ten pairs of ribs in the coronal plane according to some embodiments of the present disclosure.

In 911, one or more seed points of one or more ribs may be identified based on the dilated lung mask and/or a threshold relating to a gray level. The seed point(s) may be determined by performing a threshold segmentation based on the dilated lung mask. In some embodiments, seed points of the 1st to 9th (or 10th) pair of ribs may be identified based on the dilated lung mask in the coronal plane, while the seed points of the 10th (or 11th) to 12th pairs of ribs (also referred to as "residual ribs") may be determined in a transverse plane as illustrated below. FIG. 10C illustrates an exemplary middle image layer with ten pairs of ribs in the coronal plane according to some embodiments of the present disclosure.

Figure 10D:
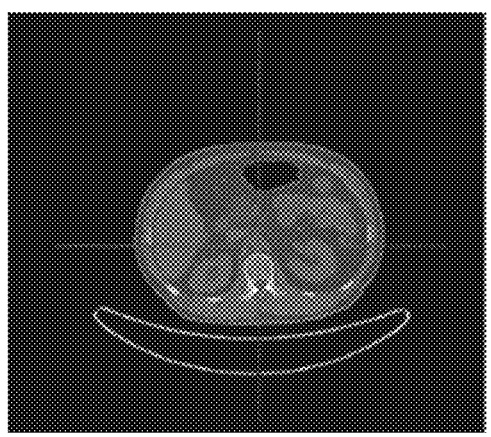
FIG. 10D illustrates an exemplary image layer (e.g., below the line) in the transverse plane with a pair of residual ribs according to some embodiments of the present disclosure.

In 913, one or more image layers in a transverse plane of the image data containing residual rib(s) not included in the middle image layer may be determined. In some embodiments, the position of a pair of ribs farthest away from the head (also referred to as "the lowest pair of ribs") in the middle image layer in the coronal plane may be determined. See, for example, the line 1005 in FIG. 10C. The residual ribs may be found in one or more image layers in the transverse plane based on the position of the lowest pair of ribs in the coronal plane. As illustrated in FIG. 10C, the residual ribs may be found in the image layers in the transverse plane below the line 1005. FIG. 10D illustrates an exemplary image layer (e.g., below the line 1005) in the transverse plane with a pair of residual ribs according to some embodiments of the present disclosure.

In 915, one or more seed points of the residual rib(s) may be identified in the transverse plane. In some embodiments, the seed point(s) of the residual rib(s) may be identified based on a threshold segmentation algorithm.

In 917, a first seed point of a first rib may be labelled based on a position of a reference pixel or voxel relating to a reference organ. In some embodiments, the reference organ may be a lung or a liver. In some embodiments, the reference pixel or voxel may relate to the apex of a lung or the base of a liver. In some embodiments, the seed points closest to the apex of a lung may be labelled as a first rib. For example, a seed point whose distance to the apex of the left lung is within a threshold may be labelled as "first left rib." As another example, a seed point whose distance to the apex of the right lung is within a threshold may be labelled as "first right rib." In some embodiments, the "twelfth left rib" and/or the "twelfth right rib" may be determined based on the position of the liver and/or the stomach. For example, a liver image layer including the lower border of the liver in the transverse plane may be determined, rib pixels/voxels may be found in the Z axis direction (i.e., from the head to the feet of a subject) in one or more image layers starting from the liver image layer, the last found rib pixel/voxel below the left lung or the stomach may be designated as the "twelfth left rib," and the last found rib pixel/voxel below the liver may be designated as the "twelfth right rib." In some embodiments, the position of the apex of the lung may be determined based on a curvature value of pixels/voxels of the lung. For example, a pixel/voxel with a maximum curvature value of the lung may be determined as the apex of the lung. In some embodiments, the position of the apex of the lung may be determined using an artificial intelligence algorithm.

In 919, a second seed point of a second rib may be labelled based on a relative position between the first seed point and the second seed point. In some embodiments, if the first rib is labelled in 917, seed points of other ribs may be successively labelled as "second left rib," "second right rib," "third left rib," "third right rib," etc. in order from top to bottom.

It should be noted that 917 through 919 may be executed simultaneously with 911 through 915. It may be indicated that a seed point may be labelled once it is identified. In some embodiments, the seed points may be labelled after all the seed points are identified. Alternatively, seed points of a twelfth pair of ribs may be firstly labelled as "twelfth left rib" and "twelfth right rib," and seed points of other ribs may be successively labelled as "eleventh left rib," "eleventh right rib," "tenth left rib," "tenth right rib," etc. in order from bottom to top.

Figure 10E:
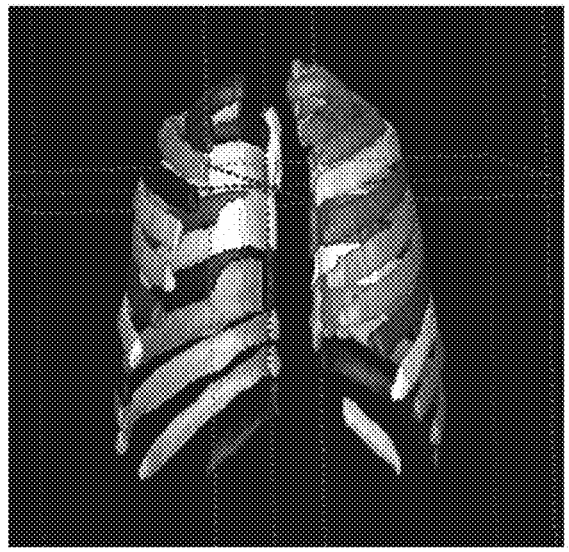
FIG. 10E illustrates exemplary labelled ribs according to some embodiments of the present disclosure.
Figure 11A:
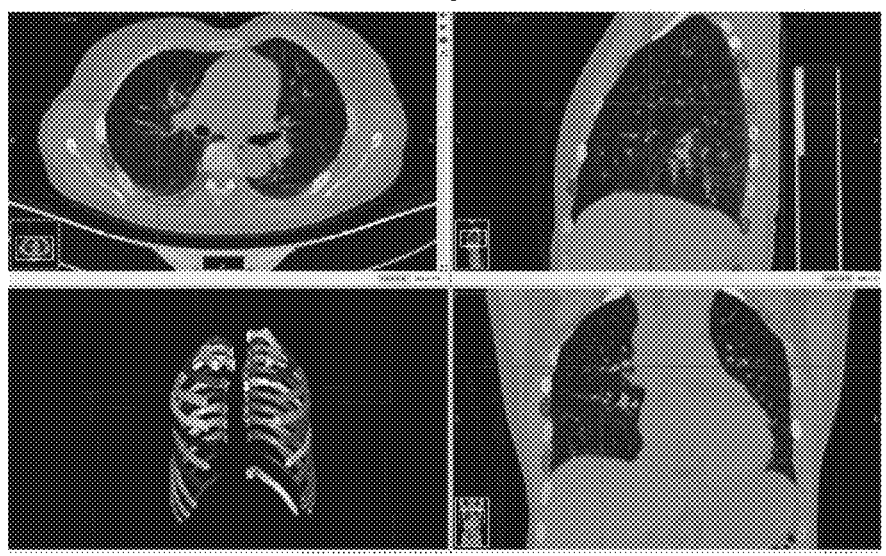
FIG. 11A through 11D illustrate exemplary test images of rib segmentation using artificial intelligence based model tracking according to some embodiments of the present disclosure.
Figure 11B:
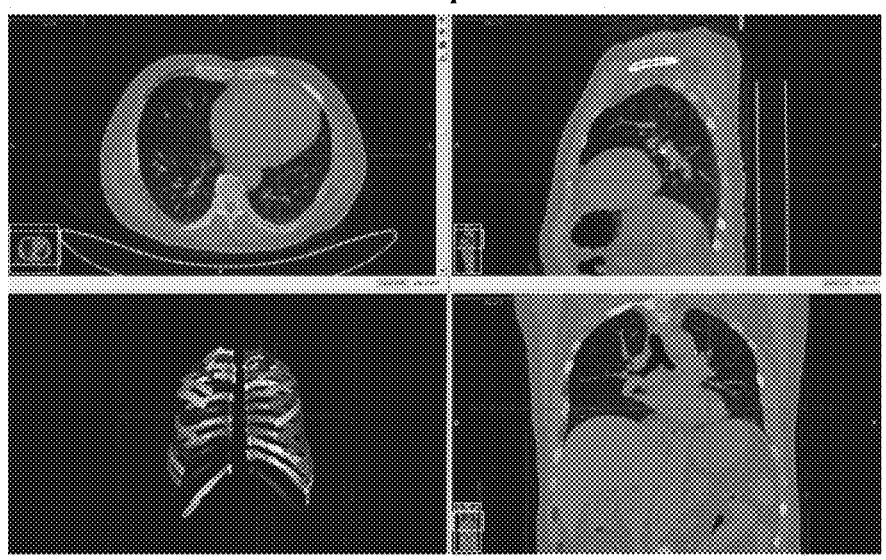
Figure 11C:
Figure 11D:
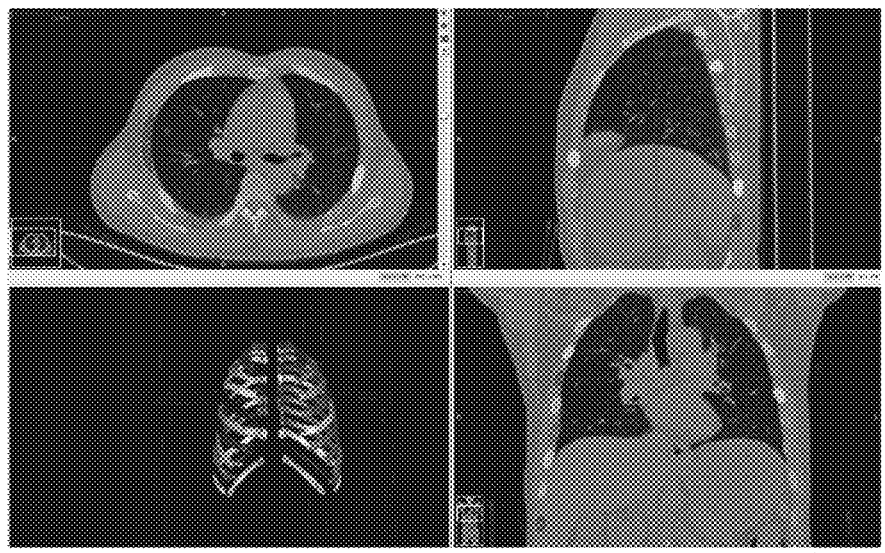

In 921, the connected domains (or regions) of ribs may be labelled based on position information of the labelled seed point(s) of the ribs and the connected domains of ribs. In some embodiments, a hit-or-miss operation may be performed. A hit-or-miss operation may refer to a matching operation for matching the labelled seed point(s) of ribs with the connected domains of ribs. In some embodiments, it may be determined to be "hit" if a labelled seed point and a part of a connected domain of a rib have the same position information. In some embodiments, it may be determined to be "miss" if the labelled seed point and no part of the connected domain of the rib have the same position information. For example, when a seed point labelled as "first left rib" has a position within a spatial range of the connected domain of a rib, the rib may be labelled as "first left rib." All the ribs determined in 903 may be labelled likewise, as illustrated in FIG. 10E. FIG. 10E illustrates exemplary labelled ribs according to some embodiments of the present disclosure.

It should be noted that the above description about the process 900 for labelling one or more ribs is merely provided for the purpose of illustration, and not intended to limit the scope of the present disclosure. For persons having ordinary skills in the art, multiple variations and/or modifications may be made under the teachings of the present disclosure.

However, those variations and modifications do not depart from the scope of the present disclosure. For example, operation 903 may be performed after operation 919. It may be indicated that the rib segmentation may be performed independently with the identification and labelling of the seed point(s), thus the rib segmentation may be performed after seed points of ribs are identified and labelled. In some embodiments, process 900 may be modified as follows: a medical image may be acquired, wherein the medical image may include a plurality of voxels corresponding to a plurality of ribs; a plurality of seed points of a plurality of first connected domains (or regions) of the plurality of ribs may be identified based on a recognition algorithm; the medical image may be segmented to obtain a plurality of second connected domains (or regions) of the plurality of ribs; the plurality of ribs may be labelled by matching the first connected domains (or regions) including the plurality of seed points with the second domains (or regions) of the plurality of ribs.

FIG. 11A through 11D illustrate exemplary test images of rib segmentation using artificial intelligence based model tracking according to some embodiments of the present disclosure. The images in the top left corner of FIG. 11A through 11D illustrate different rib images in the transverse plane. The images in the top right corner of FIG. 11A through 11D illustrate different rib images in the sagittal plane. The images in the lower left corner of FIG. 11A through 11D illustrate different segmented ribs. The images in the lower right corner of FIG. 11A through 11D illustrate different rib images in the coronal plane.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An image processing method implemented on at least one machine each of which has at least one processor and storage, the method comprising:
   acquiring image data, the image data including a plurality of ribs;
   determining a rib region containing at least a portion of the plurality of ribs;
   selecting, based on the rib region, at least one rib of the plurality of ribs as a target rib;
   generating, based on an artificial intelligence algorithm, at least one rib-probability-map relating to the target rib;
   determining, based on the image data, a starting point of the target rib, wherein determining the starting point of the target rib comprises:
      determining a histogram based on a plurality of image layers of the target rib in a coronal plane; and
      designating, based on the histogram, a characteristic point of the target rib as the starting point, wherein the characteristic point is determined based on a position in the histogram and a point at the position has a minimum value in the histogram;
   tracking, based on the starting point and the at least one rib-probability-map, at least one portion of the target rib; and
   obtaining a segmented rib by segmenting the at least one portion of the target rib.

2. The method of claim 1, wherein the selecting at least one rib of the plurality of ribs as a target rib comprises:
   determining a seed point for the at least one rib of the plurality of ribs;
   performing pre-segmentation based on the image data and the seed point to obtain a preliminary rib; and
   designating, based on a determination that the preliminary rib is adhesive to a vertebra, the preliminary rib as the target rib for further segmentation, or
   designating, based on a determination that the preliminary rib is not adhesive to a vertebra, the preliminary rib as the segmented rib.

3. The method of claim 1, wherein the determining a histogram comprises:
   superimposing a plurality of rib pixels or voxels of the plurality of image layers along an anterior-posterior direction to obtain a diagram, each element at a position of the diagram representing a total number of pixels or voxels that are located at a corresponding position in one or more of the plurality of image layers and belong to a portion of the plurality of rib pixels or voxels, wherein each pixel or voxel of the portion of the plurality of rib pixels or voxels has a gray value larger than a first threshold; and
   superimposing a plurality of elements of the diagram along a superior-inferior direction to obtain the histogram, each element of the histogram representing a sum of elements belonging to a portion of the plurality of elements, wherein all of the portion of the plurality of elements have a same position in a left-right direction.

4. The method of claim 1, wherein the generating at least one rib-probability-map relating to the target rib comprises:
   generating, based on a classifier, the at least one rib-probability-map, wherein the classifier is trained based on the artificial intelligence algorithm and a plurality of images relating to at least one sample rib.

5. The method of claim 1, wherein the tracking at least one portion of the target rib comprises:
   determining, based on the image data, a trace direction range; and
   determining, based on the trace direction range and the at least one rib-probability-map, a predicted rib segment to obtain the at least one portion of the target rib.

6. The method of claim 5, wherein the determining a predicted rib segment comprises:
   determining, within the trace direction range, at least one portion of the at least one rib-probability-map;
   determining, based on the at least one portion of the at least one rib-probability-map, a trace direction; and
   obtaining, based on the trace direction, the predicted rib segment.

7. The method of claim 5, wherein the tracking at least one portion of the target rib further comprises:
   matching the predicted rib segment with at least one rib model.

8. The method of claim 7, further comprising:
   terminating tracking the at least one portion of the target rib, based on a determination that the predicted rib segment does not match with the at least one rib model.

9. The method of claim 8, further comprising:
based on a determination that the predicted rib segment does not match with the at least one rib model,
performing, based on a plurality of matched rib segments, model reconstruction to obtain a reconstructed model; and
extracting, based on the plurality of matched rib segments, the at least one portion of the target rib.

10. The method of claim 7, further comprising:
based on a determination that the predicted rib segment matches with the at least one rib model,
designating the predicted rib segment as a matched rib segment of the target rib; and
tracking, based on the matched rib segment of the target rib and the at least one rib-probability-map, a next rib segment of the target rib.

11. The method of claim 1, wherein the target rib has a first end and a second end, wherein the first end of the target rib is spaced from a vertebra by a first distance, and the second end of the target rib is spaced from the vertebra by a second distance, and the first distance is larger than the second distance.

12. The method of claim 11, wherein the determining a starting point of the target rib comprises:
designating a point of the target rib closer to the second end than to the first end of the target rib as the starting point.

13. The method of claim 11, wherein the tracking at least one portion of the target rib comprises:
tracking the at least one portion of the target rib from the starting point to the second end of the target rib.

14. The method of claim 13, wherein the obtaining a segmented rib by segmenting the at least one portion of the target rib comprises:
segmenting a first portion of the target rib using a segmentation algorithm, wherein the first portion of the target rib includes a region between the starting point and the first end of the target rib;
segmenting the at least one portion of the target rib to obtain a second portion of the target rib, wherein the second portion includes a region between the starting point and the second end of the target rib; and
combining the first portion of the target rib and the second portion of the target rib to obtain the segmented rib related to the target rib.

15. The method of claim 14, wherein the segmentation algorithm is a region growing algorithm.

16. The method of claim 1, further comprising:
labelling the segmented rib.

17. A non-transitory computer readable medium storing instructions, the instructions, when executed by at least one processor, causing the at least one processor to implement a method comprising:
acquiring image data, the image data including a plurality of ribs;
determining a rib region containing at least a portion of the plurality of ribs;
selecting, based on the rib region, at least one rib of the plurality of ribs as a target rib;
generating, based on an artificial intelligence algorithm, at least one rib-probability-map relating to the target rib;
determining, based on the image data, a starting point of the target rib, the starting point indicating a starting position for tracking the target rib, wherein determining the starting point of the target rib comprises:
determining a histogram based on a plurality of image layers of the target rib in a coronal plane; and
designating, based on the histogram, a characteristic point of the target rib as the starting point, wherein the characteristic point is determined based on a position in the histogram and a point at the position has a minimum value in the histogram
tracking, based on the starting point and the at least one rib-probability-map, at least one portion of the target rib; and
obtaining a segmented rib by segmenting the at least one portion of the target rib.

18. A system comprising:
at least one processor, and
a storage configured to store instructions, the instructions, when executed by the at least one processor, causing the system to effectuate a method comprising:
acquiring image data, the image data including a plurality of ribs;
determining a rib region containing at least a portion of the plurality of ribs;
selecting, based on the rib region, at least one rib of the plurality of ribs as a target rib;
generating, based on an artificial intelligence algorithm, at least one rib-probability-map relating to the target rib;
determining, based on the image data, a starting point of the target rib, the starting point indicating a starting position for tracking the target rib, wherein determining the starting point of the target rib comprises:
determining a histogram based on a plurality of image layers of the target rib in a coronal plane; and
designating, based on the histogram, a characteristic point of the target rib as the starting point, wherein the characteristic point is determined based on a position in the histogram and a point at the position has a minimum value in the histogram;
tracking, based on the starting point and the at least one rib-probability-map, at least one portion of the target rib; and
obtaining a segmented rib by segmenting the at least one portion of the target rib.

19. The system of claim 18, wherein the selecting at least one rib of the plurality of ribs as a target rib comprises:
determining a seed point for the at least one rib of the plurality of ribs;
performing pre-segmentation based on the image data and the seed point to obtain a preliminary rib; and
designating, based on a determination that the preliminary rib is adhesive to a vertebra, the preliminary rib as the target rib for further segmentation, or designating, based on a determination that the preliminary rib is not adhesive to a vertebra, the preliminary rib as the segmented rib.

20. The system of claim 18, wherein the tracking at least one portion of the target rib comprises:
determining, based on the image data, a trace direction range; and
determining, based on the trace direction range and the at least one rib-probability-map, a predicted rib segment to obtain the at least one portion of the target rib.

* * * * *